(12) United States Patent
Huang et al.

(10) Patent No.: US 10,474,849 B2
(45) Date of Patent: Nov. 12, 2019

(54) SYSTEM FOR DATA PROTECTION IN POWER OFF MODE

(71) Applicants: MICROSOFT TECHNOLOGY LICENSING, LLC, Redmond, WA (US); Jerry Huang, Redmond, WA (US); Zhen Liu, Tarrytown, NY (US)

(72) Inventors: Jerry Huang, Redmond, WA (US); Zhen Liu, Tarrytown, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/400,528

(22) PCT Filed: Jun. 27, 2014

(86) PCT No.: PCT/CN2014/080947
§ 371 (c)(1),
(2) Date: Nov. 11, 2014

(87) PCT Pub. No.: WO2015/196450
PCT Pub. Date: Dec. 30, 2015

(65) Prior Publication Data
US 2017/0116440 A1 Apr. 27, 2017

(51) Int. Cl.
*G06F 21/87* (2013.01)
(52) U.S. Cl.
CPC ...... *G06F 21/87* (2013.01); *G06F 2221/2143* (2013.01)
(58) Field of Classification Search
CPC .. G06F 21/87; G06F 2221/2143; G06F 21/00; G06F 21/123; G06F 21/567
(Continued)

(56) References Cited

U.S. PATENT DOCUMENTS

| 4,593,384 A | 6/1986 | Kleijne |
| 5,389,738 A | 2/1995 | Piosenka et al. |

(Continued)

FOREIGN PATENT DOCUMENTS

| CA | 2187855 A1 | 6/1997 |
| CN | 1154389 A | 7/1997 |

(Continued)

OTHER PUBLICATIONS

International Search Report and Written Opinion Issued in PCT Patent Application No. PCT/CN2014/080947, dated Mar. 30, 2015, 16 Pages.

(Continued)

*Primary Examiner* — Kevin Bechtel
*Assistant Examiner* — Quazi Farooqui
(74) *Attorney, Agent, or Firm* — Fiala & Weaver P.L.L.C.

(57) ABSTRACT

Methods, systems, and computer program products are provided for protecting data stored on a device, even when the device is powered off. The device includes a first operating system and a security module. The first operating system (OS) is the main OS for the device, managing computer resources when the device is powered up in an "on" mode. The security module is separate from the main OS, and is configured to monitor for undesired tampering of the device. The security module is implemented in hardware that functions even when the device is turned off, and thus can protect data against unauthorized access even when the device is off. The security module may be implemented in the form of a circuit, a system-on-chip (SOC), a secondary OS that executes in a processor circuit separate from the processor hardware that operates the main OS, and/or in another manner.

20 Claims, 9 Drawing Sheets

(58) Field of Classification Search
USPC .................................................. 726/34, 35
See application file for complete search history.

(56) References Cited

U.S. PATENT DOCUMENTS

| | | | |
|---|---|---|---|
| 5,751,950 A | 5/1998 | Crisan | |
| 5,892,906 A | 4/1999 | Chou et al. | |
| 6,002,427 A | 12/1999 | Kipust | |
| 6,446,085 B1 | 9/2002 | Gusler et al. | |
| 6,480,096 B1 | 11/2002 | Gutman et al. | |
| 6,513,051 B1 | 1/2003 | Bolosky et al. | |
| 6,567,928 B1 | 5/2003 | Lyle et al. | |
| 6,609,198 B1 | 8/2003 | Wood et al. | |
| 6,681,304 B1 | 1/2004 | Vogt et al. | |
| 7,159,120 B2 | 1/2007 | Muratov et al. | |
| 7,206,938 B2 | 4/2007 | Bender et al. | |
| 7,441,275 B2 | 10/2008 | McCallam et al. | |
| 7,454,629 B2 | 11/2008 | Timmermans et al. | |
| 7,594,272 B1 | 9/2009 | Kennedy et al. | |
| 7,712,147 B2 * | 5/2010 | Lenssen | G06K 19/07372 |
| | | | 257/659 |
| 7,774,315 B1 | 8/2010 | Galker | |
| 7,791,898 B2 | 9/2010 | Peytavy et al. | |
| 8,050,698 B2 | 11/2011 | Seligmann et al. | |
| 8,195,939 B2 | 6/2012 | Reinart et al. | |
| 8,248,237 B2 | 8/2012 | Fitzgerald et al. | |
| 8,261,090 B1 | 9/2012 | Matsuoka | |
| 8,370,340 B1 | 2/2013 | Yu et al. | |
| 8,468,591 B2 | 6/2013 | Silverstone | |
| 8,499,171 B2 | 7/2013 | Mauro, II | |
| 8,504,812 B2 | 8/2013 | Shin | |
| 8,520,848 B1 | 8/2013 | Liu et al. | |
| 8,526,072 B2 | 9/2013 | Singh et al. | |
| 8,577,042 B2 | 11/2013 | Worthy | |
| 8,613,111 B2 * | 12/2013 | Condorelli | G06F 21/86 |
| | | | 361/654 |
| 8,656,016 B1 | 2/2014 | Bender et al. | |
| 8,713,450 B2 | 4/2014 | Garbow et al. | |
| 8,732,860 B2 | 5/2014 | Marron | |
| 8,826,443 B1 | 9/2014 | Raman et al. | |
| 9,003,542 B1 | 4/2015 | MacKay et al. | |
| 9,104,886 B1 | 8/2015 | Dolbakian et al. | |
| 9,697,375 B2 | 7/2017 | Huang et al. | |
| 9,734,352 B2 | 8/2017 | Huang et al. | |
| 2003/0051059 A1 | 3/2003 | Zondervan et al. | |
| 2003/0070098 A1 | 4/2003 | Tokita | |
| 2004/0044905 A1 | 3/2004 | Heath et al. | |
| 2004/0088588 A1 | 5/2004 | Awada et al. | |
| 2004/0172562 A1 | 9/2004 | Berger et al. | |
| 2004/0187037 A1 | 9/2004 | Checco | |
| 2004/0193910 A1 | 9/2004 | Moles | |
| 2005/0044338 A1 | 2/2005 | Goss | |
| 2005/0044404 A1 | 2/2005 | Bhansali et al. | |
| 2005/0166065 A1 | 7/2005 | Eytchison et al. | |
| 2005/0198525 A1 | 9/2005 | Trossen et al. | |
| 2005/0289358 A1 | 12/2005 | Haselden et al. | |
| 2006/0174339 A1 | 8/2006 | Tao | |
| 2006/0206524 A1 | 9/2006 | Maclaurin | |
| 2006/0210167 A1 | 9/2006 | Inoue et al. | |
| 2006/0220850 A1 | 10/2006 | Bowser et al. | |
| 2006/0224898 A1 | 10/2006 | Ahmed | |
| 2007/0233667 A1 | 10/2007 | Mani | |
| 2007/0250920 A1 | 10/2007 | Lindsay | |
| 2007/0255946 A1 | 11/2007 | Kokubun | |
| 2008/0022133 A1 | 1/2008 | Sobel et al. | |
| 2008/0066187 A1 | 3/2008 | Dive-reclus et al. | |
| 2008/0098172 A1 | 4/2008 | Tsang et al. | |
| 2008/0172745 A1 | 7/2008 | Reinart et al. | |
| 2009/0037720 A1 | 2/2009 | Cho | |
| 2009/0064316 A1 | 3/2009 | Liao et al. | |
| 2009/0083850 A1 | 3/2009 | Fadell et al. | |
| 2009/0144619 A1 | 6/2009 | Best et al. | |
| 2009/0222500 A1 | 9/2009 | Chiu et al. | |
| 2009/0253408 A1 | 10/2009 | Fitzgerald et al. | |
| 2009/0259588 A1 | 10/2009 | Lindsay | |
| 2009/0328238 A1 | 12/2009 | Ridewood Glendinning | |
| 2010/0005531 A1 | 1/2010 | Largman et al. | |
| 2010/0179874 A1 | 7/2010 | Higgins et al. | |
| 2010/0180335 A1 | 7/2010 | Smithson | |
| 2010/0207721 A1 | 8/2010 | Nakajima et al. | |
| 2010/0266162 A1 | 10/2010 | Singh et al. | |
| 2010/0269165 A1 | 10/2010 | Chen et al. | |
| 2010/0299757 A1 | 11/2010 | Lee | |
| 2011/0023115 A1 | 1/2011 | Wright | |
| 2011/0145914 A1 | 6/2011 | Zhu | |
| 2011/0202999 A1 | 8/2011 | Logan et al. | |
| 2012/0036582 A1 | 2/2012 | Little et al. | |
| 2012/0047574 A1 | 2/2012 | Kim et al. | |
| 2012/0081392 A1 | 4/2012 | Arthur | |
| 2012/0102549 A1 | 4/2012 | Mazzaferri et al. | |
| 2012/0131365 A1 | 5/2012 | Tabone et al. | |
| 2012/0216001 A1 | 8/2012 | Ramly et al. | |
| 2012/0246737 A1 | 9/2012 | Paxton et al. | |
| 2012/0246739 A1 | 9/2012 | Mebed | |
| 2012/0250862 A1 | 10/2012 | Bosson | |
| 2012/0254986 A1 | 10/2012 | Levien et al. | |
| 2012/0278905 A1 | 11/2012 | Condorelli et al. | |
| 2012/0295708 A1 | 11/2012 | Hernandez-abrego et al. | |
| 2012/0297202 A1 | 11/2012 | Gallet et al. | |
| 2013/0005443 A1 | 1/2013 | Kosta et al. | |
| 2013/0029640 A1 | 1/2013 | Wong et al. | |
| 2013/0117867 A1 | 5/2013 | Fung | |
| 2013/0182918 A1 | 7/2013 | Kovtun et al. | |
| 2013/0191908 A1 | 7/2013 | Klein | |
| 2013/0212367 A1 | 8/2013 | Ingalls et al. | |
| 2013/0219176 A1 | 8/2013 | Akella et al. | |
| 2013/0232584 A1 | 9/2013 | Baentsch et al. | |
| 2013/0254831 A1 | 9/2013 | Roach et al. | |
| 2013/0265218 A1 | 10/2013 | Moscarillo | |
| 2013/0276125 A1 | 10/2013 | Bailey | |
| 2013/0279689 A1 | 10/2013 | Obaidi | |
| 2013/0283380 A1 | 10/2013 | Thadikaran et al. | |
| 2013/0305351 A1 | 11/2013 | Narendra et al. | |
| 2013/0305354 A1 | 11/2013 | King et al. | |
| 2013/0307766 A1 | 11/2013 | Amathnadu et al. | |
| 2014/0006347 A1 | 1/2014 | Qureshi et al. | |
| 2014/0013422 A1 | 1/2014 | Janus et al. | |
| 2014/0013576 A1 | 1/2014 | Barnes | |
| 2014/0032833 A1 | 1/2014 | Cudak et al. | |
| 2014/0033299 A1 | 1/2014 | Mcgloin et al. | |
| 2014/0075493 A1 | 3/2014 | Krishnan et al. | |
| 2014/0082745 A1 | 3/2014 | Guedalia et al. | |
| 2014/0115690 A1 | 4/2014 | Huang et al. | |
| 2014/0123322 A1 * | 5/2014 | Hadley | G06F 21/602 |
| | | | 726/30 |
| 2014/0132392 A1 | 5/2014 | Kady | |
| 2014/0143887 A1 | 5/2014 | Marston et al. | |
| 2014/0173286 A1 | 6/2014 | Novak | |
| 2014/0188804 A1 | 7/2014 | Gokhale et al. | |
| 2014/0245015 A1 | 8/2014 | Velamoor et al. | |
| 2014/0366159 A1 | 12/2014 | Cohen | |
| 2015/0003691 A1 | 1/2015 | Joo et al. | |
| 2015/0135260 A1 | 5/2015 | Ilyadis et al. | |
| 2015/0148011 A1 | 5/2015 | Chen | |
| 2015/0199378 A1 | 7/2015 | Reyntjens | |
| 2015/0302194 A1 | 10/2015 | Voelckel et al. | |
| 2015/0302207 A1 | 10/2015 | Sprenger et al. | |
| 2017/0116440 A1 | 4/2017 | Huang et al. | |

FOREIGN PATENT DOCUMENTS

| | | |
|---|---|---|
| CN | 1517889 A | 8/2004 |
| CN | 1834976 A | 9/2006 |
| CN | 101026822 A | 8/2007 |
| CN | 101141721 A | 3/2008 |
| CN | 101458666 A | 6/2009 |
| CN | 101470787 A | 7/2009 |
| CN | 101673249 A | 3/2010 |
| CN | 102004881 A | 4/2011 |
| CN | 1729539 B | 6/2011 |
| CN | 102184359 A | 9/2011 |
| CN | 102799833 A | 11/2012 |
| CN | 202795383 U | 3/2013 |
| CN | 202841292 U | 3/2013 |

(56) References Cited

FOREIGN PATENT DOCUMENTS

| | | | |
|---|---|---|---|
| CN | 103034819 A | 4/2013 | |
| CN | 103037310 A | 4/2013 | |
| CN | 103049284 A | 4/2013 | |
| CN | 103077339 A | 5/2013 | |
| CN | 103218579 A | 7/2013 | |
| CN | 103324875 A | 9/2013 | |
| CN | 103391367 A | 11/2013 | |
| CN | 103402006 A | 11/2013 | |
| CN | 103729363 A | 4/2014 | |
| EP | 2456247 A1 | 5/2012 | |
| GB | 2348568 A | 10/2000 | |
| KR | 20060119572 A | 11/2006 | |
| TW | 200937197 A | 9/2009 | |
| WO | 2009018125 A1 | 2/2009 | |

OTHER PUBLICATIONS

Indian patent application IN2012CH01975, "Self powered tamper proof mechanism for electronic equipments", Nov. 22, 2013, 29 pages.

High-Speed Secure Microcontroller, Published on: Aug. 18, 2003, Available at: http://www.keil.com/dd/docs/datashts/dallas/ds5240.pdf, 3 pages.

"How to use the M41ST87W tamper detect and RAM clear", In Proceedings of DocID010159 Rev 5, Oct. 2013, 8 pages.

"Anti-Tamper Capabilities in FPGA Designs", In proceedings of White paper of Altera, Jul. 2008, 9 pages.

Gladman, et al., "Physical Tamper Resistance", In Security Engineering: A Guide to Building Dependable Distributed Systems Chapter 14, Nov. 18, 2012, 28 pages.

"Embedded Security", Published on: Nov. 18, 2012, Available at: http://pdfserv.maximintegrated.com/en/pg/EMBEDDED_SECURITY.pdf, 8 pages.

Liu, et al., "System for Context-Based Data Protection", unfiled US Patent Application.

Liu, et al., "Data Protection Based on Device User Recognition", unfiled US Patent Application.

Liu, et al., "Data Protection System Based on User Input Patterns on Device", unfiled US Patent Application.

Liu, et al., "Data Protection Through Implicit User Logon Mechanisms", unfiled US Patent Application.

Liu, et al., "Data Protection using Dual File Systems", unfiled US Patent Application.

"First Office Action and Search Report Issued in Chinese Patent Application No. 201480047957.X", dated Feb. 23, 2018, 18 Pages.

"Secure Mobile Computing using Biotelemetries", Retrieved from http://www.cs.virginia.edu/~acw/SecureMobileComputing/, Dec. 16, 2008, 4 Pages.

"Final Office Action Issued in U.S. Appl. No. 14/400,529", dated Feb. 17, 2017, 11 Pages.

"Booting", Retrieved from https://web.archive.org/web/20141117150835/http://en.wikipedia.org/wiki/Booting, Nov. 17, 2014, 13 Pages.

"Final Office Action Issued in U.S. Appl. No. 14/400,529", dated Oct. 25, 2017, 14 Pages.

"Non Final Office Action Issued in U.S. Appl. No. 14/400,529", dated Jun. 12, 2017, 14 Pages.

"Non Final Office Action Issued in U.S. Appl. No. 14/400,529", dated Jul. 21, 2016, 12 Pages.

"Final Office Action Issued in U.S. Appl. No. 14/402,280", dated Mar. 22, 2017, 13 Pages.

"Final Office Action Issued in U.S. Appl. No. 14/402,280", dated Jun. 7, 2018, 6 Pages.

"Non-final Office Action Issued in U.S. Appl. No. 14/402,280", dated Dec. 19, 2016, 15 Pages.

"Final Office Action Issued in U.S. Appl. No. 14/402,982", dated Apr. 28, 2017, 22 Pages.

"Non Final Office Action Issued in U.S. Appl. No. 14/402,982", dated Oct. 5, 2017, 27 Pages.

"Non Final Office Action Issued in U.S. Appl. No. 14/402,982", dated Oct. 6, 2016, 21 Pages.

"Non-final Office Action Issued in U.S. Appl. No. 14/403,024", dated Dec. 9, 2016, 13 Pages.

"Search Report Issued in European Patent Application No. 14895867.1", dated Jan. 19, 2018, 7 Pages.

"Search Report Issued in European Patent Application No. 14895916.6", dated Jan. 24, 2018, 7 Pages.

"Office Action Issued in European Patent Application No. 14896252.5", dated Oct. 17, 2017, 6 Pages.

"First Office Action and Search Report Issued in Chinese Patent Application No. 201480047891.4", dated Apr. 2, 2018, 16 Pages.

"Office Action Issued in Chinese Patent Application No. 201480047932.X", dated Feb. 2, 2018, 16 Pages.

"First Office Action Issued in Chinese Patent Application No. 201480048056.2", dated Apr. 3, 2018, 14 Pages.

"First Office Action Issued in Chinese Patent Application No. 201480048282.0", dated Mar. 23, 2018, 18 Pages.

Bo, et al., "Silentsense: Silent User Identification via Touch and Movement Behavioral Biometrics", In Proceedings of the 19th Annual International Conference on Mobile Computing & Networking, Sep. 30, 2013, 9 Pages.

Stanton, et al., "FABS: File and Block Surveillance System for Determining Anomalous Disk Accesses", In Proceedings from the Sixth Annual IEEE SMC Information Assurance Workshop, Jun. 15, 2005, 8 Pages.

Costello, Sam, "How to Protect Data on Lost or Stolen iPhone", Retrieved from https://www.lifewire.com/protect-data-on-lost-stolen-phone-2000298, Oct. 30, 2010, 1 Page.

Hu, et al., "Mobile Data Protection Using Handheld Usage Context Matching", In Tenth International Conference on Mobile Data Management: Systems, Services and Middleware, May 18, 2009, pp. 594-599.

Maiorana, et al., "Keystroke Dynamics Authentication for Mobile Phones", In Proceeding of the ACM Symposium on Applied Computing, Mar. 21, 2011, 6 Pages.

Monrose, et al., "Keystroke Dynamics as a Biometric for Authentication", In Future Generation Computer Systems, vol. 16, Issue 4, Mar. 1, 1999, 15 Pages.

"International Search Report and Written Opinion Issued in PCT Application No. PCT/CN2014/080935", dated Mar. 30, 2015, 12 Pages "International Search Report and Written Opinion Issued in PCT Application No. PCT/CN2014/080943", dated Mar. 30, 2015, 15 Pages.

"International Search Report and Written Opinion Issued for PCT Application No. PCT/CN2014/080944", dated Mar. 27, 2015, 16 Pages.

"International Search Report and Written Opinion Issued in PCT Application No. PCT/CN2014/080945", dated Mar. 27, 2015, 14 Pages.

"International Search Report and Written Opinion Issued in PCT Patent Application No. PCT/CN2014/080948", dated Mar. 27, 2015, 12 Pages.

Peacock, et al., "Typing Patterns: A Key to User Identification", In Journal of IEEE Security and Privacy, vol. 2, Issue 5, Sep. 2004, 8 Pages.

Rorypiper, "Powerguard Have Your iDevice Request a Password Before Powering Off", Retrieved from http://www.phoneincanada.ca/jailbreak/powergaurd-have-your-idevice-request-a-password-before-powering-off/, Jun. 22, 2012, 7 Pages.

Saevanee, et al., "Authenticating user Using Keystroke Dynamics and Finger Pressure", In 6th IEEE Consumer Communications and Networking Conference, Jan. 10, 2009, 2 Pages.

Seifert, et al., "Treasurephone: Context-Sensitive User Data Protection on Mobile Phones", In Proceedings of the 8th International Conference on Pervasive Computing, May 17, 2010, 8 Pages.

Seo, et al., "User Input Pattern-based Authentication Method to Prevent Mobile e-Financial Incidents", In Ninth IEEE International Symposium on Parallel and Distributed Processing with Applications Workshops, May 26, 2011, 6 Pages.

(56) References Cited

OTHER PUBLICATIONS

"True Crypt—Wikipedia", Retrieved From: https://en.wikipedia.org/w/index.php?title=TrueCrypt&oldid=614464822, Retrieved on: Aug. 28, 2018, 19 Pages.
"Non Final Office Action Issued in U.S. Appl. No. 14/402,280", dated Oct. 11, 2017, 13 Pages.
"Search Report Issued in European Patent Application No. 14895897.8", dated Oct. 26, 2017, 8 Pages.
"Second Office Action Issued in Chinese Patent Application No. 201480047891.4", dated Sep. 5, 2018, 7 Pages.
"Second Office Action Issued in Chinese Patent Application No. 201480047932.X", dated Aug. 13, 2018, 12 Pages.
"Second Office Action Issued in Chinese Patent Application No. 201480047957.X", dated Oct. 19, 2018, 20 Pages.
"Office Action Issued in Chinese Application No. 201480048186.6", dated Jan. 22, 2018, 11 Pages.
Yang, et al., "EagleVision: A Pervasive Mobile Device Protection System", In Proceedings of 6th Annual International Mobile and Ubiquitous Systems: Networking & Services, Jul. 16, 2009, 10 Pages.
"Second Office Action Issued in Chinese Patent Application No. 201480048056.2", dated Jan. 16, 2019, 11 Pages.
"Second Office Action and Search Report Issued in Chinese Patent Application No. 201480048282.0", dated Dec. 4, 2018, 16 Pages.
"Office Action Issued in European Patent Application No. 14895916.6", dated Jan. 25, 2019, 5 Pages.
"Third Office Action Issued in Chinese Patent Application No. 201480047932.X", dated Jan. 25, 2019, 13 Pages.
Frank et al., "Touchalytics: On the Applicability of Touchscreen Input as a Behavioral Biometric for Continuous Authentication", In Proceedings of the IEEE Transactions on Information Forensics and Security, vol. 8, Issue 1, Jan. 1, 2013, 13 Pages.
"Office Action Issued in European Application No. 14895916.6"dated Mar. 25, 2019, 4 Pages.
"Third Office Action Issued in Chinese Patent Application No. 201480048282.0", dated Apr. 18, 2019, 10 Pages.
"Office Action Issued in Chinese Patent Application No. 201480047932.X", dated Apr. 28, 2019, 9 Pages.
"Notice of Allowance Issued in U.S. Appl. No. 14/400,529", dated Jun. 18, 2019, 15 Pages.
"Third Office Action Issued in Chinese Patent Application No. 201480048056.2", dated Jul. 16, 2019, 7 Pages.
"Office Action Issued in European Patent Application No. 14895916.6", dated Aug. 12, 2019, 5 Pages.

* cited by examiner

702

Enable device tampering to be assigned to the data

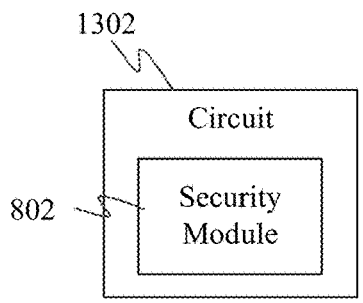
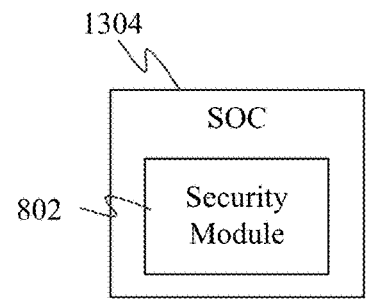
FIG. 13A    FIG. 13B
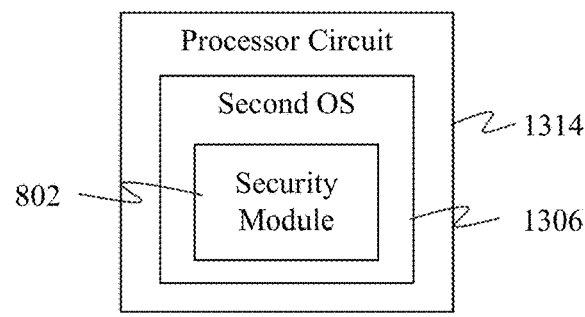
FIG. 13C
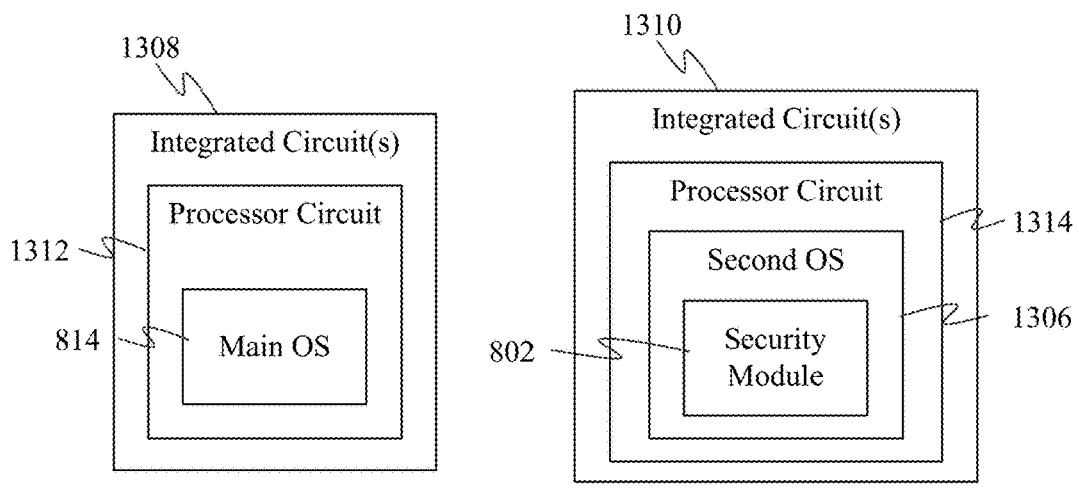
FIG. 13D

SYSTEM FOR DATA PROTECTION IN POWER OFF MODE

This application is a U.S. national phase of International Application No. PCT/CN2014/080947 filed Jun. 27, 2014, which designated the U.S. and is incorporated by reference herein in its entirety.

BACKGROUND

Increasingly more data is being stored on devices, particularly mobile devices. For instance, people may store personal data, and employees may store corporate data, governmental data, client-related data, intellectual property, and/or other sensitive forms of data on their devices. This sensitive data is put at risk when a device is lost, stolen, or compromised in some other manner.

To address this issue, techniques have been developed to protect sensitive data on devices. Conventional device data protection techniques typically rely on some form of user authentication, encryption, or a combination thereof. For example, a user may set up her device to require a particular password or PIN to be entered before data may be accessed on the device. Additionally, some devices enable users to encrypt files or folders stored thereon, which means that a code must be entered before a file can be viewed or copied. While such mechanisms can help protect sensitive data from unauthorized access, they are not foolproof. For example, a password mechanism will not work if the user is forced to give out her password against her will, or if the device is taken away while in active operation (i.e., after the user has already entered her password). Still other means may be used to overcome user authentication and encryption schemes. Once these data protection measures have been overcome, there is typically no way to protect the sensitive data from unauthorized access.

If a user determines that she is in a place where her device is likely to be stolen, she may be able to take active steps to protect the sensitive data. For example, the user may be able to input commands to the device to delete all the sensitive data therefrom. Depending upon the scenario, this may be necessary to protect the user's personal safety as well as the sensitive data. However, in many situations, the user will not be able to anticipate that her device will be stolen and thus will not take such steps. Even in situations where the user can anticipate a device theft, the user may not have sufficient time at her disposal to interact with her device to delete the sensitive data therefrom.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for protecting data stored on a device, even when the device is powered off. The device includes a first operating system and a security module. The first operating system (OS) is the main OS for the device, managing computer resources when the device is powered up in an "on" mode. The security module is separate from the main OS, and is configured to monitor for undesired tampering of the device. The security module is implemented in hardware that functions even when the device is turned off, and thus can protect data against unauthorized access even when the device is off.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 13A-13D show various example implementations of a security module, according to embodiments.

Figure 1:
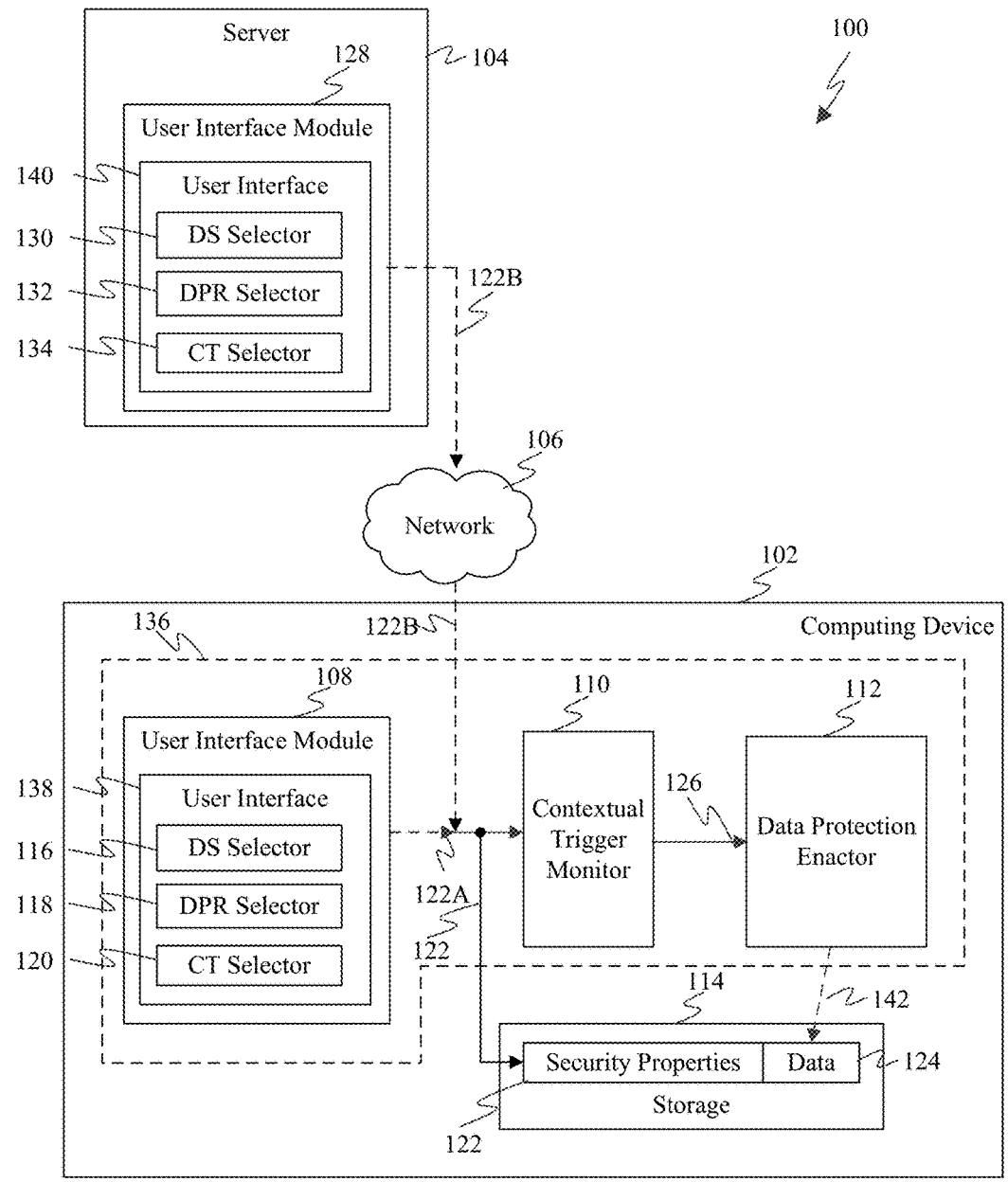
FIG. 1 shows a block diagram of a data protection environment that includes a data protection system configured to protect data stored on a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes exemplary data protection environments that include a computing device that implements contextually triggered data protection. Section III describes an exemplary embodiment where device tampering is a contextual trigger for data protection. Section IV describes example mobile and desktop device implementations of the computing device. Section V provides some example embodiments. Section VI provides some concluding remarks.

II. Example Embodiments for Contextually Triggered Data Protection

Embodiments described herein enable protection of data stored on devices in a configurable and automatic manner based on context. Context-based data protection enables a user to set up policies to protect data on devices against undesired access, such as in situations where a device has been stolen, where the device is being used against the user's will (e.g., the user has been forced to give out the device password, the device has been taken away while in active operation, etc.), and in other situations. Predefined actions are automatically executed to protect the data when a risky external context is detected so as to prevent the data from being compromised.

Context-based data protection systems guard against access that is unintentionally or unwillingly authorized by users. Data is automatically protected from being compromised when a risky context is identified.

Embodiments for context-based data protection enforcement and execution architectures are provided. An enforcement architecture may be used to define data sensitivity levels (e.g., Level 1, Level 2, etc.), data protection responses (e.g., soft delete, hard delete, etc.), risk/trigger contexts (Context 1, Context 2), and a mapping between these elements (e.g., Level 1->Context 1->soft delete, which indicates that Level 1 content is to be soft deleted when Context 1 is detected). An execution architecture is configured to activate the predefined action/response to ensure the data is protected. Actions such as a "soft delete" (hiding of data) can be recovered from, while a "hard delete" erases data completely without an option for recovery of the data.

In embodiments, potential risky situations can arise in a power off mode for the device. For instance, when the device is in a power off mode, a person may attempt to open the device to remove one or more memory devices from the device to access the data stored therein. Techniques for detecting the situation automatically are provided. In an embodiment, enforcement of data security in this situation can be accomplished by including an additional hardware in the form of a chipset (e.g., an additional processor, OS, etc.) in the device to implement tamper detection. For instance, a low-power, always-on integrated circuit chip and second OS may be present in the device to protect against storage removal from the device. Data protection actions are executed by the second, always-on OS upon detecting that the device hardware is being tampered with, even when the main OS of the device is off.

In one example embodiment, data protection may be configured for selected data on a device as follows: The device is equipped with a special purpose chipset (one or more IC chips) that operates at low power to handle device tampering. The chipset may include a second OS that is always on. This OS connects with sensors installed at one or more device locations, such as being attached to a housing/physical container of the device, in an enclosure internal to the housing of the device, at a storage frame in the device (e.g., attached to screws of a storage frame internal to the device), etc. In this always-on OS, a context setting may be configured. The sensors monitoring the physical container are configured to set the conditions for an acceptable opening of the device (e.g., a correct screw opening sequence). In the main OS, the content stored in the device that is to be protected may be selected, as well as the context for triggering data protection, and the particular protection response(s). For instance, a data protection request may be requested on one or more files/folders to mark the content to be protected. When tampering of the physical container is detected by the second OS (whether or not the main OS is on), the second OS executes the predefined data protection response(s)/action(s), which may include a hard delete of the content, such that data that is marked as sensitive may automatically be deleted without any option for recovery.

Various possible responses can be taken to protect the data in the event that the contextual trigger is detected. Examples of such data protection responses include one or more of: hard delete, where data marked as sensitive is automatically deleted from the device without any option for recovery; a soft delete, where data marked as sensitive is automatically hidden by the operating system (OS) by deleting the links to the data and storing the links in a safe location (soft deleted data is stored, but not visible by the user, the protected data can be encrypted, etc.); an alert may be provided to the user (e.g., a message, a sound, a visual alert, etc.); a file may be disabled from opening; an opened window displaying the data may be closed; the opened window may be hidden behind other windows; etc.

Note that in embodiments, one or more of such data protections may be performed "discretely," such that a user handling a device is not aware of the data protection response being performed. For instance, a person handling a device may cause a data protection response to be enacted by tampering with the device (e.g., attempting to open a housing of the device to get at device memory), by failing to enter a passcode or key sequence at the correct time, by transporting the device to a particular location, by interacting with a device UI in an unfamiliar manner, by a biometric condition of the person being sensed, etc. The data protection response may be enacted in a discrete manner, such that the person is unaware that the response is being performed. For instance, the data may be hidden, soft deleted, or hard deleted discretely, such that the person is not even aware that the data is or was ever present on the device. Additionally, or alternatively, displayed windows may be rearranged before the person has seen the prior arrangement of the windows, an alert may be transmitted to an owner or administrator of the device without the person's knowledge, and/or other data protection responses may be performed in a discrete manner.

Such discrete performance of data protection can have various benefits. For instance, an unauthorized person attempting to access sensitive data on a device may trigger a soft deleting or hiding of that sensitive data. If the unauthorized person is not aware that the data is or was ever present on the device, and does not immediately find the data on the device (because it is hidden or soft deleted), that person may more quickly lose interest in attempting to find the data on the device. Furthermore, if an authorized user of the device is under threat from the unauthorized person, the authorized user has greater plausible deniability as to any presence of the data on the device.

If the data is soft deleted as a data protection response, the data may later be recovered by the OS. When data is soft deleted, only the links to the data (e.g., files) are deleted. The data can be recovered/restored by restoring the links from a safe store. In one embodiment, the restoration of the data can be automatic, such as the next time that the user logs in with the correct password and correct password entering context. Alternatively, the restoration may be triggered by a correct password context.

Accordingly, embodiments provide for features, such as methods and systems for automatic and discrete triggering of data protection against external risky environments in which the user is located, methods and systems for defining sensitive data to be protected via a content attribute, data protection that covers the data on the device for all accounts, and methods and systems for detecting device tampering as the context for activating the data protection response(s).

Further description of data protection embodiments is provided in the following subsections. For instance, the immediately following subsection describes further embodiments for the configuring of protections on data, followed by a subsection that describes further embodiments for the triggering and enactment of data protection.

A. Example Embodiments for Configuring Data Protection

Data protection systems may be configured in various ways to protect data from undesired access, in embodiments. For instance, FIG. 1 shows a block diagram of a data protection environment 100 that includes a data protection system 136 configured to protect data stored on a computing device 102, according to an example embodiment. As shown in FIG. 1, data protection environment 100 includes computing device 102 and a server 104. Computing device 102 and server 104 are communicatively coupled by a network 106. Data protection system 136 is included in computing device 102. In the embodiment of FIG. 1, data protection system 136 includes a user interface module 108, a contextual trigger monitor 110, a data protection enactor 112, and storage 114. Furthermore, server 104 includes a user interface module 128. The features of environment 100 are described as follows.

As shown in FIG. 1, data protection system 136 may be implemented in computing device 102. Note that in another embodiment, data protection system 136 may be implemented partially in computing device 102 and partially in server 104. For instance, user interface module 108, contextual trigger monitor 110, and data protection enactor 112 may be included in computing device 102. Alternatively, user interface module 108 may not be present in computing device 102, but instead, user interface 128 of server 104 may be part of data protection system 136 along with contextual trigger monitor 110 and data protection enactor 112. In another embodiment, both of user interfaces 108 and 128 may be present and part of data protection system 136.

Computing device 102 may be any type of stationary or mobile computing device, including a mobile computer (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a digital camera, or other type of mobile device, or a stationary computing device such as a desktop computer or PC (personal computer).

Storage 114 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Data 124 shown stored in storage 114 may be any type of data, including one or more files, one or more folders, a combination of files and folders, and/or any other type of data structure and/or number of data structures. Although a single instance of data (data 124) is shown stored in storage 114, the single instance of data is shown in FIG. 1 for ease of illustration. It is to be understood that any number of instances of data may be stored in storage 114, with each instance being one or more files and/or folders of any size having corresponding security parameters configured as disclosed herein.

Examples of network 106 include a local area network (LAN), a wide area network (WAN), a personal area network (PAN), and/or a combination of communication networks, such as the Internet. For communications over network 106, computing device 102 and server 104 may each include a network interface (e.g., a network interface card (NIC), etc.), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc.

A user may interact with user interface module 108 (when present) at computing device 102, or may interact with user interface module 128 (when present) at server 104, to configure data protection for data stored by computing device 102, such as data 124 stored in storage 114. The user that configures the data protection may be an owner or other user of computing device 102, a system administrator (e.g., when computing device 102 is a device of an enterprise), or other person.

User interface module 108 at computing device 102 may be present as a convenient way for a user of computing device 102 to configure protection for data stored in computing device 102. User interface module 108 may be part of a data protection application stored in computing device 102 (e.g., a standalone desktop or mobile application, an "app" that is partially cloud-based, etc.), may be part of an OS of computing device 102, or may be present and configured in computing device 102 in another manner.

When interacting with a user interface generated by user interface module 108, a user may be enabled to determine stored data in storage 114, such as data 124, to select such data for data protection configuration. The user may interact with the user interface to configure data protection for data 124, and may store the data protection configuration in association with data 124 as security properties 122.

In another embodiment, it may be desired to not have user interface module 108 in computing device 102. For instance, it may be determined to be a security weakness if any person who obtains and is able to log into computing device 102 has access to user interface 108, and therefore can configure (including remove) protections for data stored at computing device 102. In such an embodiment, user interface module 108 may not be present at computing device 102, and instead, user interface module 128 may be present at server 104 to be used to configure protection for data stored in computing device 102. For example, user interface module 128 may be part of a data protection application (or the OS) stored in server 102 that is not network accessible, may be part of a network accessible application (e.g., a browser accessible application), or may be present and configured in server 104 in another manner.

When interacting with a user interface generated by user interface module 128 of server 104, a user may be enabled to determine stored data at computing device 102 through network 106, such as data 124, to select such data for data protection configuration. The user may interact with the user interface to configure data protection for data 124, and may store the data protection configuration in association with data 124 as security properties 122.

Figure 2:
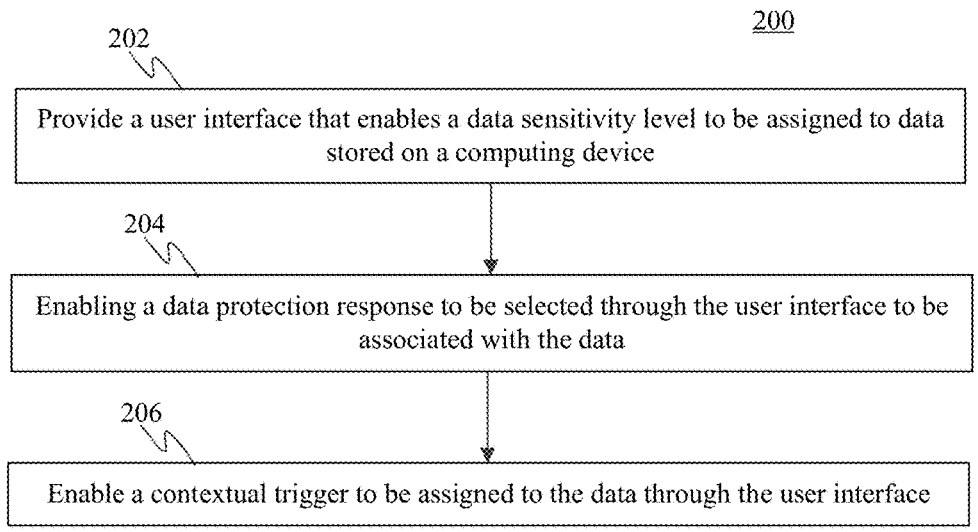
FIG. 2 shows a flowchart providing a process for configuring protection for stored data, according to an example embodiment.

User interface module 108 and/or user interface module 128 may be used to configure data protection in any manner, in embodiments. For instance, in an embodiment, user interface module 108 and/or user interface module 128 may operate according to FIG. 2. FIG. 2 shows a flowchart 200 providing a process for configuring protection for stored data, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, a user interface is provided that enables a data sensitivity level to be assigned to data stored on a computing device. For example, as shown in FIG. 1, user interface module 108 (when present) may generate a user interface 138, and user interface module 128 (when present) may generate a user interface 140. User interface 138 and user interface 104 may each be any type of user interface that includes any number of user interface elements, including a graphical user interface, a touch interface, a voice control interface, a haptic interface, a gesture interface, etc.

In an embodiment, user interface 138 and/or user interface 140 may be provided to enable a data sensitivity level to be assigned to data stored on computing device 102, such as data 124. As shown in FIG. 1, user interface 138 includes a first data sensitivity (DS) selector 116, and user interface 140 includes a second DS selector 130. DS selector 116 and/or DS selector 130, depending on which is present, may be interacted with by a user to assign a data sensitivity level to data 124. For instance, DS selector 116 and/or DS selector 130 may be a user interface element such as a checkbox, a toggle switch, a button, a pull down menu, or another user interface element. The user may interact with the user interface element to select a data sensitivity for data 124. For example, a user may interact with DS selector 116 or DS selector 130 to designate selected data as either sensitive or non-sensitive. In an embodiment, a user may also interact with DS selector 116 or DS selector 130 to designate selected data as having differing degrees of sensitivity (e.g., not sensitive, moderately sensitive, highly sensitive, etc.).

In step 204, a data protection response is enabled to be selected through the user interface to be associated with the data. In an embodiment, user interface 138 and/or user interface 140 may be provided to enable a data protection response to be assigned to data stored on computing device 102, such as data 124. The data protection response is to be enacted with regard to the data in the event that the data is determined to at least potentially be threatened with undesired or risky access (e.g., computing device 102 is misplaced, is potentially stolen, is known to have been stolen, is potentially being accessed by an unauthorized person, a user of computing device 102 is being forced to access the data, etc.).

As shown in FIG. 1, user interface 138 includes a first data protection response (DPR) selector 118, and user interface 140 includes a second DPR selector 132. DPR selector 118 and/or DPR selector 132, depending on which is present, may be interacted with by a user to assign a data protection response to data 124. For instance, DPR selector 118 and/or DPR selector 132 may be any type of user interface element disclosed herein or otherwise known. The user may interact with the user interface element to select a data protection response for data 124. Various types of data protection responses may be available for selection and assignment to data 124.

Figure 3:
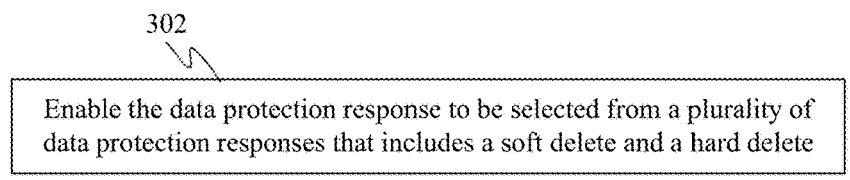
FIG. 3 shows a process for selecting a data protection response for data, according to an example embodiment.

For instance, in an embodiment, step 204 of flowchart 200 may include a process shown in FIG. 3. FIG. 3 shows a step 302 for selecting a data protection response for data, according to an example embodiment. In step 302, the data protection response is enabled to be selected from a plurality of data protection responses that includes a soft delete and a hard delete. Thus, in an embodiment, DPR selector 118 and/or DPR selector 132 may provide a list of data protection responses, and one or more of the data protection responses may be selected from the list and assigned to the data (e.g., by a pull down menu, checkboxes, etc.). The data protection response may comprise hard deleting the data or soft deleting the data. As will be discussed in more detail herein, a "hard delete" comprises rendering data permanently inaccessible (e.g., overwriting the data in memory/storage), while a "soft delete" comprises rendering the data temporarily inaccessible such that it may be recovered at a subsequent time.

Figure 4:
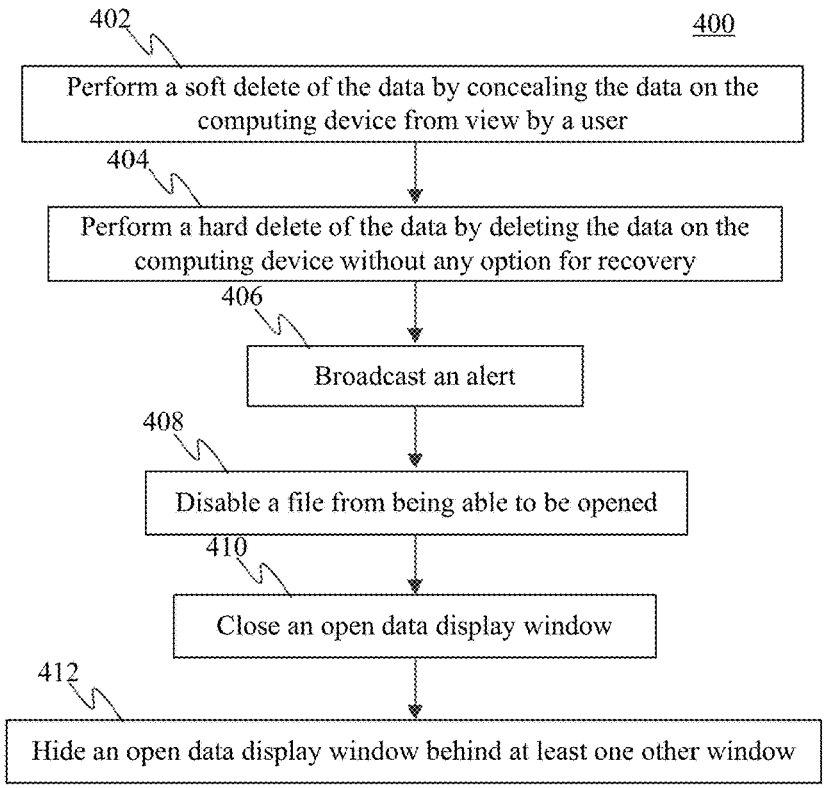
FIG. 4 shows a flowchart that is a list of selectable data protection responses, according to an example embodiment.

Further types of data protection responses may be selected from. For instance, FIG. 4 shows a flowchart 400 providing a process for selectable data protection responses, according to an example embodiment. Each step of flowchart 400 describes a separate and independent data protection response. Any one or more of the data protection responses described in flowchart 400 may be selected and assigned to a particular instance of data. Flowchart 400 is described as follows. Further structural and operational embodiments will be apparent to persons skilled in the relevant art(s) based on the following description.

Flowchart 400 begins with step 402. In step 402, a soft delete of the data is performed by concealing the data on the computing device from view by a user. As described above, DPR selector 118 and/or DPR selector 132 may provide an option for a soft delete to be assigned as a data protection response for data. According to a soft delete, the data is concealed on computing device 102 from view by a user. For instance, links to a file that represents the data may be deleted, and the links and/or data may be stored in a location considered safe for possible later recovery/restoration.

In step 404, a hard delete of the data is performed by deleting the data on the computing device without any option for recovery. As described above, DPR selector 118 and/or DPR selector 132 may provide an option for a hard delete to be assigned as a data protection response for data. According to a hard delete, the data is deleted from storage (e.g., storage 114) in a manner that the data cannot be recovered or restored. For instance, the storage location where the data was stored may be overwritten with a pattern of ones and zeroes.

In step 406, an alert is broadcast. In an embodiment, DPR selector 118 and/or DPR selector 132 may provide an option for an alert to be assigned as a data protection response for data. An alert may be configured to notify an authorized user of computing device 102 (e.g., the owner, a system administrator, etc.) that the data may be threatened with unauthorized access. The alert may be delivered/transmitted to an address of phone number of the authorized user, or presented in another form, including as an email message, a text message, a social network message, a phone call, a beeping noise (or other sound), etc.

In step 408, a file is disabled from being able to be opened. In an embodiment, DPR selector 118 and/or DPR selector 132 may provide an option for disabling one or more files (representing data) from being able to be opened as a data protection response for the data. The file(s) may be disabled from being opened in any manner, including by locking the file(s), increasing permissions on the file(s) (above the access rights of the user), etc.

In step 410, an open data display window is closed. In an embodiment, DPR selector 118 and/or DPR selector 132 may provide an option for closing an open display window that displays data as a data protection response for the data.

In step 412, an open data display window is hidden behind at least one other window. In an embodiment, DPR selector 118 and/or DPR selector 132 may provide an option for hiding an open display window behind one or more other windows as a data protection response for the data. For instance, the data display window may be moved behind one or more other windows that are already open, and/or one or more new windows may be opened in front of the data display window.

Note that, as described herein, DPR selector 118 and/or DPR selector 132 may be interacted with to assign a data protection response to data. In another embodiment, a data protection response may be pre-associated with a data sensitivity, and when the data sensitivity level is assigned to particular data, the associated data protection response is also assigned to the data. For instance, a soft delete may be associated with a low data sensitivity level, and a hard delete may be associated with a high data sensitivity level. If a low sensitivity level is assigned to particular data (in step 202 of flowchart 200), the soft delete is also automatically assigned to the particular data (in step 204).

Referring back to FIG. 2, in step 206, a contextual trigger is enabled to be assigned to the data through the user interface. In an embodiment, user interface 138 and/or user interface 140 may be provided to enable a contextual trigger to be assigned to data stored on computing device 102, such as data 124. The contextual trigger may be a condition or set of conditions that, when detected, indicate that computing device 102 has become subject or susceptible to an unauthorized access.

As shown in FIG. 1, user interface 138 includes a first contextual trigger (CT) selector 120, and user interface 140 includes a second CT selector 134. CT selector 120 and/or CT selector 134, depending on which is present, may be interacted with by a user to set a contextual trigger, the detection of which causes a data protection mode to be activated by data protection enactor 112. For instance, CT selector 120 and/or CT selector 134 may be any type of user interface element disclosed herein or otherwise known. The user may interact with the user interface element to select a contextual trigger for data 124. Examples of contextual triggers include but are not limited to: sensing that unauthorized users are in close proximity to computing device 102; tampering with computing device 102; failure of a user to provide required input during device boot-up, login, or shut down; and sensed behaviors of a user of computing device 102 indicating that the user is not an authorized user. A wide variety of other contextual triggers may be used as well.

As described above, the sensitivity level, data protection response, and contextual trigger may be selected for assignment to data 124. Selections of sensitivity level, data protection response, and contextual trigger made at computing device 102 are output from user interface module 108 as security properties 122A. Selections of sensitivity level, data protection response, and contextual trigger made at server 104 are output from user interface module 128 as security properties 122B, and are transmitted in a communication signal over network 106 to computing device 102. Security properties 122A or 122B may be stored in association with data 124 as security properties 122.

B. Example Embodiments for Triggering and Enacting Data Protection

Figure 5:
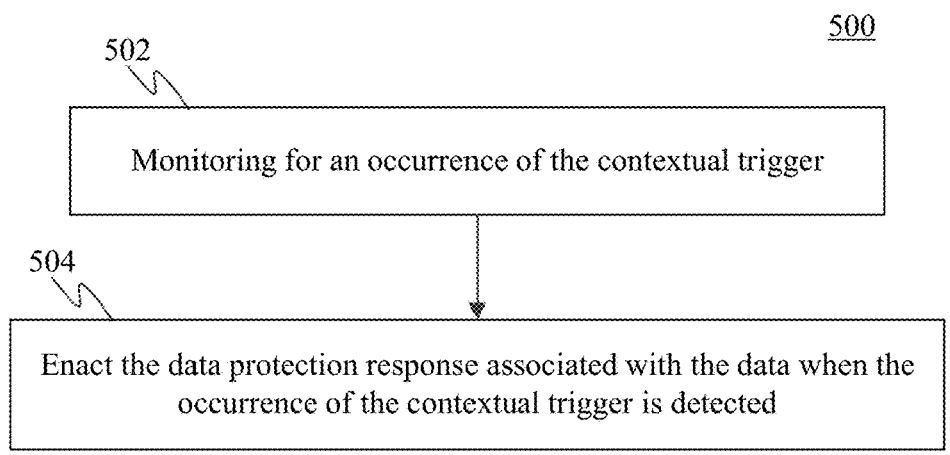
FIG. 5 shows a flowchart providing a process for monitoring a contextual trigger associated with data to trigger enactment of a data protection response, according to an example embodiment.

Data protection systems may be configured in various ways to monitor for data threatened with unauthorized access, and to enact data protection policies to protect the data. For instance, as described above with respect to FIG. 1, data protection system 136 in computing device 102 includes contextual trigger monitor 110 and data protection enactor 112. Contextual trigger monitor 110 and data protection enactor 112 are configured to detect unauthorized access of data, and to enact data protection. Contextual trigger monitor 110 and data protection enactor 112 are described as follows with respect to FIG. 5. FIG. 5 shows a flowchart 500 providing a process for monitoring a contextual trigger associated with data to trigger enactment of a data protection response, according to an example embodiment. Flowchart 500, contextual trigger monitor 110 and data protection enactor 112 are described as follows. Further structural and operational embodiments will be apparent to persons skilled in the relevant art(s) based on the following description.

Flowchart 500 begins with step 502. In step 502, an occurrence of the contextual trigger is monitored for. For example, as shown in FIG. 1, contextual trigger monitor 110 receives the contextual trigger(s) of security properties 122 associated with data 124. Contextual trigger monitor 110 may receive the contextual trigger(s) of security properties 122 directly from user interface module 108 or from storage 114. Contextual trigger monitor 110 operates over time to determine if any of the contextual trigger(s) have been detected. If contextual trigger monitor 110 determines that a contextual trigger has been detected, then contextual trigger monitor 110 notifies data protection enactor 112 by generating a trigger notification 126.

In step 504, the data protection response associated with the data is enacted when the occurrence of the contextual trigger is detected. In response to trigger notification 126, data protection enactor 112 may enact the data protection response(s) in security properties 122 associated with data 124. The enacted data protection response is illustrated as enacted action 142 in FIG. 1.

In embodiments, the data protection response in security properties 122 may indicate, and data protection enactor 112 may enact, any one or more data protection responses mentioned herein or otherwise known. For example, the data protection response may indicate and data protection enactor 112 may enact any one or more of the data protection responses shown in flowchart 400 (FIG. 4) and described elsewhere herein, and/or any other suitable data protection responses that would be apparent to persons skilled in the relevant art(s) based on the teachings herein. Accordingly, data protection enactor 112 may include or access functionality for performing one or more data protection responses. For instance, data protection enactor 112 may include or access a file manager module capable of performing soft deletes of files and/or folders (which may include file encryption, file/folder moving and/or renaming, reconfiguring links to files/folders, etc.). Data protection enactor 112 may include or access a messaging module configured to send alert messages (e.g., a texting tool, an email tool, an instant messaging tool, a social network messaging tool, a phone communication tool, an audio tool, etc.). In another example, data protection enactor 112 may include or access a window management module (e.g., of an OS) capable of rearranging displayed windows and/or opening windows. Data protection enactor 112 may be configured with additional and/or alternative functionality for performing one or more data protection responses, as would be apparent to persons skilled in the relevant art(s) based on the teachings herein.

Figure 6:
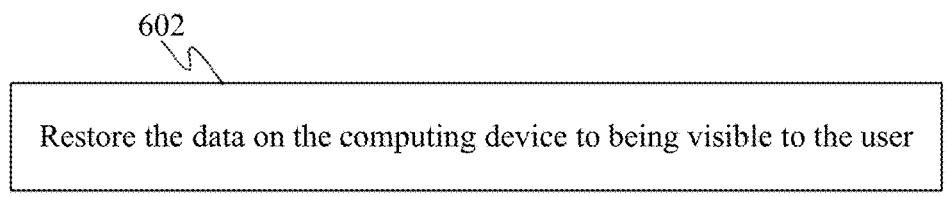
FIG. 6 shows a process for restoring data that was deleted according to a soft delete, according to an example embodiment.

Accordingly, in embodiments, data protections may be triggered for data stored on a device based on context, such as unwanted tampering with the device, etc. Examples of such data protections include soft deletes, hard deletes, alerts, etc. It is noted that if data is soft deleted, the data may be restored once it is determined that the threat of unauthorized data access has diminished or passed. Accordingly, FIG. 6 shows a process for restoring data that was deleted according to a soft delete, according to an example embodiment. In step 602, the data is restored on the computing device to being visible to the user. In such an embodiment, data that was previously soft deleted or hidden in the device may be restored or recovered. For instance, the links to the data file(s) can be restored from a safe location in storage, etc. The restoration can be automatic, such as a next time that the authorized user logs into computing device 102 with a correct password and correct password entering context. Alternatively, the restoration may be triggered only in a manual fashion, such as by being triggered by password context.

III. Example Embodiments for Device Tampering as a Trigger for Data Protection As described above, particular data may be selected for protection. For instance, with reference to FIG. 1, a user may interact with user interface module 108 (computing device 102) or user interface module 128 (server 104) to configure security parameters for data. A data sensitivity level may be assigned to the data (e.g., step 202 in FIG. 2), and a data protection response may be assigned to the data (e.g., step 204 in FIG. 2). In an embodiment, device tampering may be assigned to be a contextual trigger (e.g., in step 206 of FIG. 2). If computing device 102 is physically tampered with in a manner where it is apparent that an entity is trying to gain unauthorized access to data by extracting one or more physical components (e.g., memory device(s)) from computing device 102, such tampering may be detected and used to trigger a data protection response.

Figure 7:
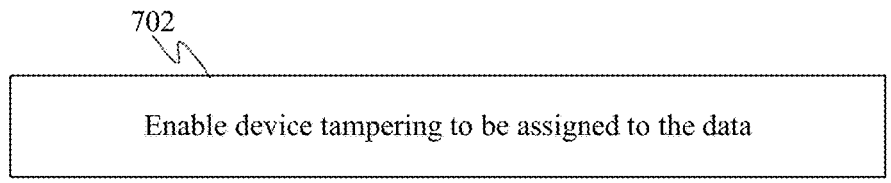
FIG. 7 shows a process for assigning device tampering to data as a contextual trigger, according to an example embodiment.

For instance, FIG. 7 shows a step 702 for assigning a contextual trigger to data, according to an example embodiment. In step 702, device tampering is enabled to be assigned to the data. Accordingly, unwanted tampering of a device that contains the data of interest is a contextual trigger. For example, when computing device 102 is tampered with in an unwanted manner, such as by an unauthorized person attempting to open device 102 (e.g., to remove one or more memory devices), the contextual trigger may be detected, and the selected data protection response may be enacted.

CT selector 120 and/or CT selector 134 may enable device tampering to be selected in various ways. For instance, CT selector 120 and/or CT selector 134 may enable a general "device tampering" type of contextual trigger selection to be made. In such case, any tampering sensors present in computing device 102 may be monitored as a potential contextual trigger for the data. In another embodiment, CT selector 120 and/or CT selector 134 may enable particular tampering sensors that are included in computing device 102 to be individually selected as a contextual trigger. Examples of such sensors that may be present include device opening sensors, screw sensors (that sense screws being turned that hold together the device housing, that attach structures internal to the housing such as a storage frame, etc.), light sensors (that sense the device housing being opened by detecting environmental light), device housing integrity sensors, etc.

Figure 8:
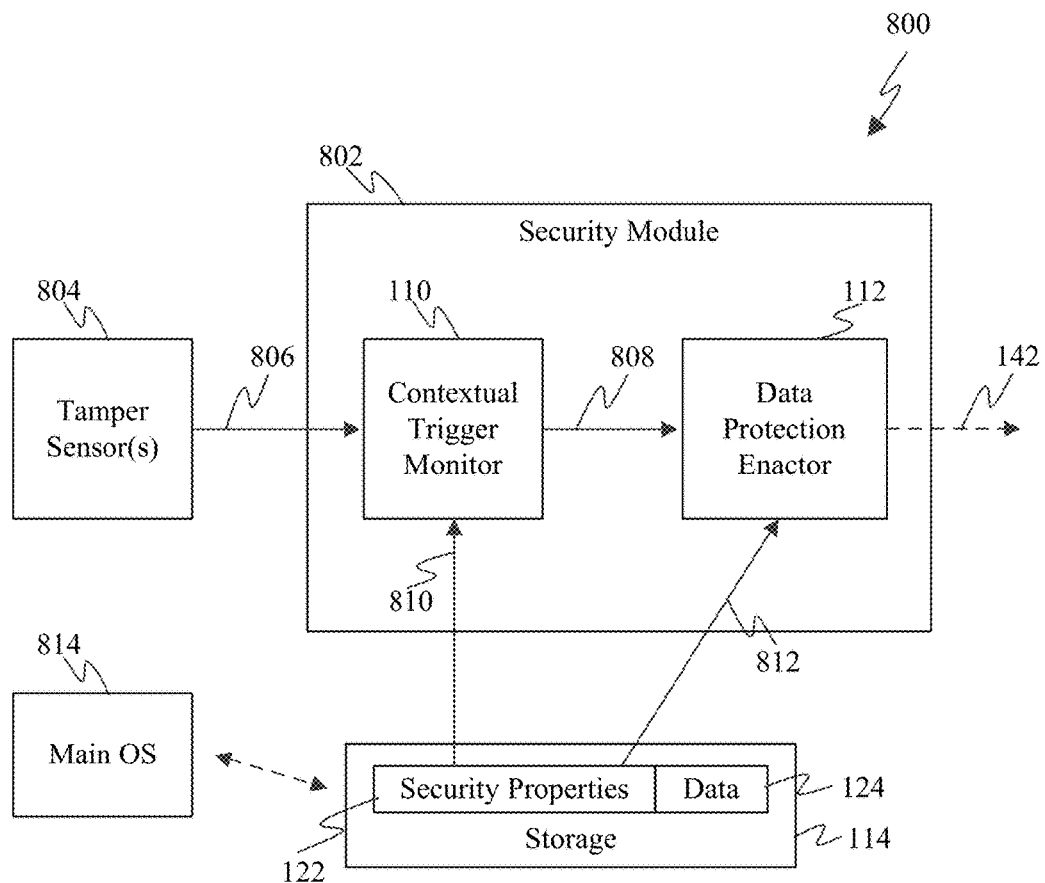
FIG. 8 shows a block diagram of a data protection system configured to use device tampering as a contextual trigger for data protection, according to an example embodiment.

Data protection system 136 may be configured in various ways to monitor for tamper triggers indicating that data is threatened with unauthorized access. For instance, FIG. 8 shows a block diagram of a data protection system 800 configured to use device tampering as a contextual trigger for data protection, according to an example embodiment. As shown in FIG. 8, data protection system 800 includes a security module 802 and one or more tamper sensor(s) 804. Security module 802 is configured to monitor for device tampering and enact data protection for a computing device, even when the computing device is turned off/powered down. Security module 802 includes contextual trigger monitor 110 and data protection enactor 112. A main OS 814 and storage 114 are also present in FIG. 8. In an embodiment, contextual trigger monitor 110 may perform step 502 of flowchart 500 (FIG. 5), and data protection enactor 112 of security module 802 may perform step 504 of flowchart 500. Data protection system 800 is an example of data protection system 136 shown in FIG. 1, and for ease of illustration, not all features of system 800 are necessarily shown in FIG. 8. Data protection system 800 may be included in computing device 102. Data protection system 800 is described as follows.

In the embodiment of FIG. 8, contextual trigger monitor 110 is configured to use device tampering as a contextual trigger for data protection. In particular, as shown in FIG. 8, tamper sensor(s) 804 is/are configured to sense tampering by an unauthorized person of computing device 102. Tamper sensor(s) 804 may determine tampering of a device in various ways, including by sensing one or more attributes of computing device 102 that would indicate tampering.

Figure 9:
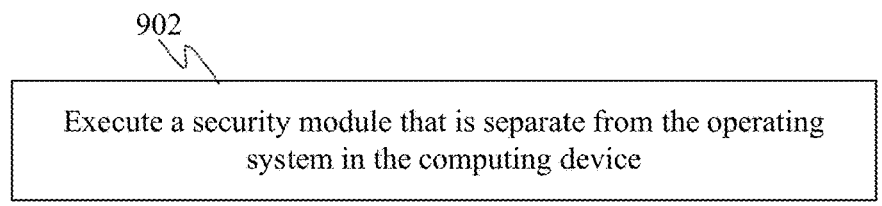
FIG. 9 shows a process for executing a security module, according to an example embodiment.

Accordingly, in an embodiment, data protection system 800 may operate according to FIG. 9. FIG. 9 shows a step 902 for executing a security module, according to an example embodiment. In step 902, a security module is executed that is separate from the operating system in the computing device. For instance, as shown in FIG. 8, security module 802 operates separately from main OS 814. Main OS 814 executes in processor hardware of computing device 102 to manage device resources when computing device 102 is powered up in an "on" mode. Computing device 102 may be powered down by a user, such as by the user moving a power switch of computing device 102 from "On" to "Off," by the user holding down a predetermined button of computing device 102 for a predetermined amount of time, by the user speaking the words "power off" (or similar words), or by the user performing other action, or by computing device 102 automatically turning off (e.g., after a predetermined amount of time of non-use to save power). When computing device 102 is powered down, and main OS 814 is therefore no longer able to operate, security module 802 continues to operate. In this manner, security module 802 can detect tampering with computing device 102 even when computing device 102 is turned off. In an embodiment, security module 802 is configured to consume low power (relative to main OS 814 executing in processor hardware of computing device 102). In this manner, security module 802 can remain operating when computing device 102 is turned off, without consuming excessive power that rapidly drains the batteries of computing device 102.

Figure 10:
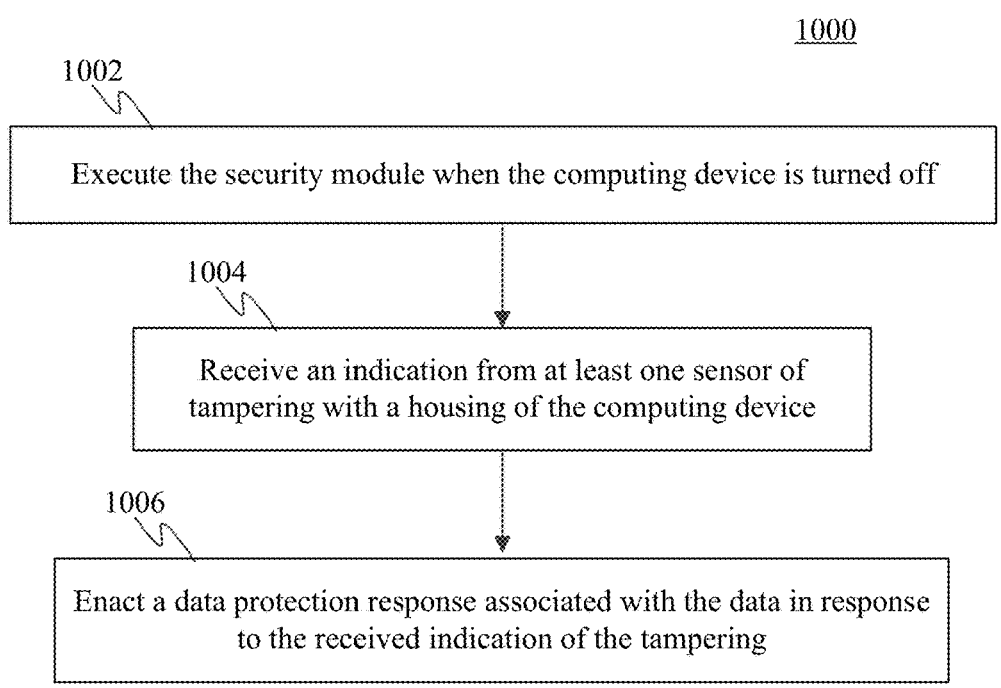
FIG. 10 shows a flowchart providing a process for monitoring device tampering to trigger enactment of a data protection response, according to an example embodiment.

As such, security module 802 may operate in various ways. For instance, FIG. 10 shows a flowchart 1000 providing a process for monitoring device tampering to trigger enactment of a data protection response, according to an example embodiment. In an embodiment, security module 802 may operate according to flowchart 1000. Flowchart 1000 is described as follows with respect to FIG. 8. Further structural and operational embodiments will be apparent to persons skilled in the relevant art(s) based on the following description.

Flowchart 1000 begins with step 1002. In step 1002, the security module executes when the computing device is turned off. As described above, security module 802 is configured to execute even when computing device 102 is turned off. In this manner, security module 802 can protect data from unauthorized access even when computing device 102 is powered down. In embodiments, security module 802 is implemented in hardware (e.g., one or more processor circuits and/or other circuitry) that is coupled to power (e.g., one or more batteries of computing device 102), receives this power continuously, and does not enter an "off" or "power save" mode when computing device 102 is turned off.

In step 1004, an indication is received from at least one sensor of tampering with a housing of the computing device. For example, with respect to FIG. 8, tamper sensor(s) 804 is/are configured to detect tampering with computing device 102. Tamper sensor(s) 804 may detect tampering with a housing of computing device 102, such as a prying, unscrewing, or otherwise interacting with features of the housing to open computing device 102, drilling or otherwise forming a hole in a surface of computing device 102, impacting computing device 102 with an object or impacting an object with computing device 102 to attempt to crack open computing device 102, or otherwise tampering with the housing. Such tamper interactions may be performed by unauthorized persons in an attempt to remove a storage device that contains protected data from computing device 102. As shown in FIG. 8, tamper sensor(s) 804 generates a tamper indicator 806, which indicates that a tamper sensor has detected tampering with computing device 102. Contextual trigger monitor 110 is configured to monitor tamper indictor 806 for the indication of tampering.

Figure 11:
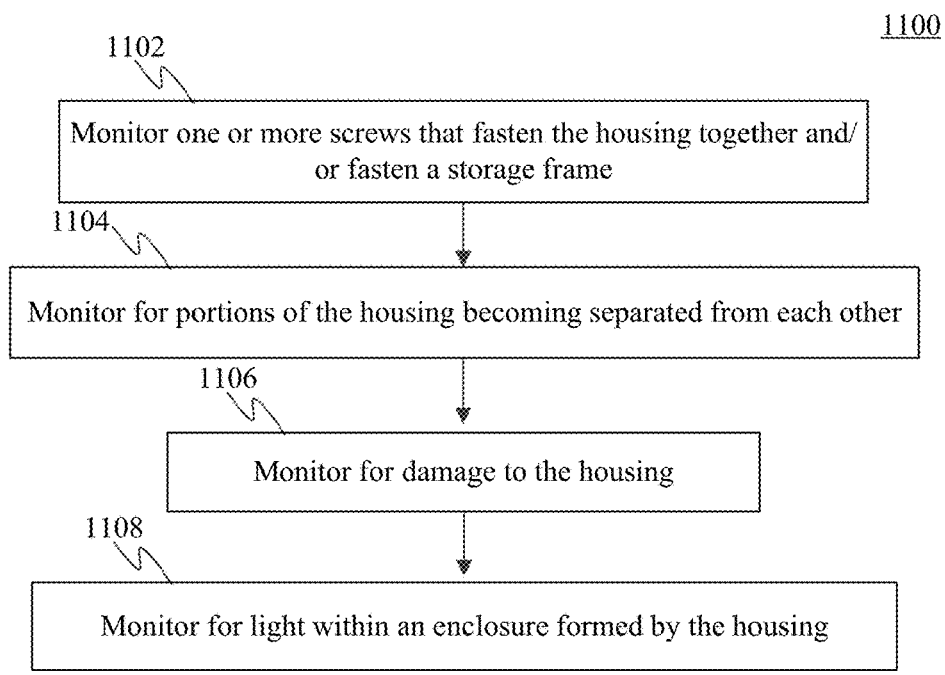
FIG. 11 shows a flowchart providing various processes for monitoring tamper sensors in a device, according to an example embodiment.
Figure 12:
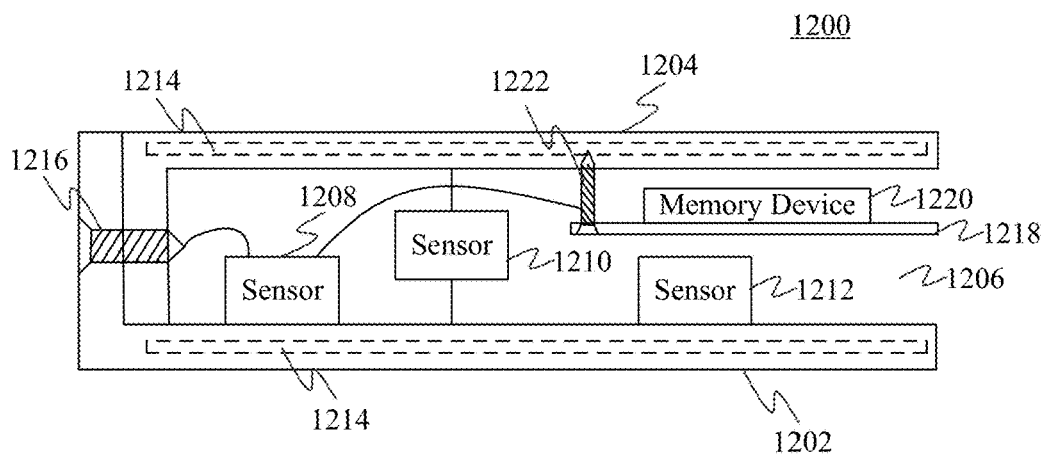
FIG. 12 shows a cross-sectional view of a portion of a device that incorporates sensors to monitor for tampering, according to an example embodiment.

For example, in an embodiment, contextual trigger monitor 110 may operate according to FIG. 11. FIG. 11 shows a flowchart 1100 providing various processes for monitoring tamper sensors in a device, according to an example embodiment. Each step of flowchart 1100 describes a separate and independent form of tamper monitoring that may be performed. Any one or more of the tamper monitoring processes described in flowchart 1100 may be performed by contextual trigger monitor 110, depending on the particular tamper sensors that are present and configured for monitoring. Flowchart 1100 is described as follows with respect to FIGS. 8 and 12 for illustrative purposes. FIG. 12 shows a cross-sectional view of a portion of a device 1200 that incorporates sensors to monitor for tampering, according to an example embodiment. Device 1200 is an example of computing device 102. Further structural and operational embodiments will be apparent to persons skilled in the relevant art(s) based on the following description.

Flowchart 1100 begins with step 1102. In step 1102, one or more screws are monitored that fasten the housing together and/or fasten a storage frame. In an embodiment, contextual trigger monitor 110 may be configured to monitor one or more screw sensors that monitor screws of a computing device. The screw sensors may be configured to determine whether screws holding together structures of the computing device are being turned and/or removed from the computing device. If screws are being removed and/or turned, the computing device may be in the process of being opened and/or structures such as memory devices of the computing device may be in the process of being removed. As such, the screw sensors may detect tampering with the computing device by detecting one or more screws being turned and/or removed, and may generate tamper indicator 806 to indicate this.

For example, with reference to FIG. 12, device 1200 includes a first housing portion 1202 and a second housing portion 1204. First and second housing portions 1202 and 1204 interlock as shown in FIG. 12 to form a housing for components of device 1200. Examples of such components include such as a display, one or more buttons, one or more microphones, one or more cameras, one or more integrated circuits and/or other electronic components, etc. The housing forms an enclosure 1206 in which some of the components may be contained. In embodiments, device 1200 may include any number of housing portions.

As shown in FIG. 12, first and second housing portions 1202 and 1204 may be connected together by one or more screws 1216. Furthermore, as shown in FIG. 12, one or more screws 1222 may attach other components of device 102 to the housing of device 102, such as a component board or storage frame 1218 that mounts one or more memory devices 1220. Screws 1216 and/or 1222 may be coupled to one or more screw sensors 1208. Screw sensor 1208 is configured to detect when a screw, such as one of screws 1216 and/or 1222 is being turned and/or removed. When screw 1216 is being turned or removed, this indicates that the housing of device 1200 is being opened so that internal components, such as memory device 1220, which may store sensitive data, may be removed. Similarly, when screw 1222 is being turned or removed, this indicates that a motherboard or storage frame 1218 is being removed so that mounted components, such as memory device 1220, which may store sensitive data, may be removed.

Examples of screw sensor 1208 include a potentiometer or other type of variable resistor, etc. One or more screw sensors 1208 may be communicatively coupled with contextual trigger monitor 110 to provide tamper indicator 806 to contextual trigger monitor 110, to indicate that one or more respective screws are being tampered with.

In step 1104, portions of the housing are monitored for becoming separated from each other. In an embodiment, contextual trigger monitor 110 may be configured to monitor one or more housing sensor(s) that detect whether portions of the housing of the computing device are being separated from each other. The housing sensors may be configured to determine whether the computing device is in the process of being opened such that structures such as memory devices of the computing device may be in jeopardy of being removed. As such, the housing sensor(s) may detect tampering with the computing device by detecting housing portions being separated, and may generate tamper indicator 806 to indicate this.

For example, with reference to FIG. 12, device 1200 may include one or more housing sensors 1210 that are coupled to different portions of the housing of device 1200. In the example of FIG. 12, housing sensor 1210 is coupled between first and second housing portions 1202 and 1204, and therefore can detect when first and second housing portions 1202 and 1204 are being separated from each other, and device 1200 is being opened. For example, housing sensor 1210 may be a connectivity sensor connected in circuit with one or more electrically conductive and/or magnetic posts that are normally coupled when device 1200 is closed. The posts separate from each other when first and second housing portions 1202 and 1204 are moved apart from each other, causing an open circuit, an increase in resistance, a decrease in current flow (due to the open circuit), and/or a change in a magnetic field that can be sensed by housing sensor 1208. In other embodiments, housing sensor 1210 can be configured in another way to detect when first and second housing portions 1202 and 1204 are separated from each other.

In step 1106, damage to the housing is monitored for. In an embodiment, contextual trigger monitor 110 may be configured to monitor one or more housing structure sensors that detect whether the housing of the computing device is being damaged. The housing structure sensor(s) may be configured to determine whether the computing device is in the process of being drilled into, broken, smashed, etc., such that structures such as memory devices of the computing device may be in jeopardy of being removed. As such, the housing structure sensor(s) may detect tampering with the computing device by detecting the housing being damaged, and may generate tamper indicator 806 to indicate this.

For example, with reference to FIG. 12, device 1200 may include one or more housing structure sensors 1214 that may be incorporated in and/or along surfaces of the housing of device 1200. In the example of FIG. 12, housing structure sensors 1214 are integrated in a material of first and second housing portions 1202 and 1204, and therefore can detect when first and second housing portions 1202 and 1204 are being damaged, and an enclosure 1206 of device 1200 is being accessed. For example, housing structure sensor 1210 may be a resistive sensor or a piezoelectric film sensor that detects damage to first and/or second housing portions 1202 and 1204, an acceleration sensor that detects device 1200 being accelerated to a velocity where damage may occur (e.g., when being smashed or hurled against a surface), or other type of damage sensor.

In step 1108, light is monitored for within an enclosure formed by the housing. In an embodiment, contextual trigger monitor 110 may be configured to monitor one or more light sensors that detect whether the housing of the computing device has been opened. The light sensor(s) may be configured to determine that the computing device opened because an amount of light received by the light sensor(s) has increased, such that structures such as memory devices of the computing device may be in jeopardy of being removed. As such, the light sensors may detect tampering with the computing device by detecting the housing being damaged, and may generate tamper indicator 806 to indicate this.

For example, with reference to FIG. 12, device 1200 may include one or more light sensors 1212 that may be incorporated in enclosure 1206 of device 1200. In the example of FIG. 12, light sensor 1212 is mounted to an inner surface of first housing portion 1202, but in other embodiments may be mounted elsewhere in device 1200. Therefore, light sensor 1212 can detect when device 1200 has been opened (e.g., first and second housing portions 1202 and 1204 have been separated from each other, because an amount of light received by light sensor 1212 when device 1200 is opened (environmental light is received by light sensor 1212) is significantly greater than the amount of light received by light sensor 1212 when device 1200 is closed (enclosure 1206 is dark). For example, light sensor 1212 may be a photodiode or other type of light sensor.

It is noted that the sensors shown in FIG. 12 and the sensor monitoring processes shown in flowchart 1100 of FIG. 11 are provided for illustrative purposes, and are not intended to be limiting. Further types of sensors and monitoring processes may be apparent to persons skilled in the relevant art(s) from the teachings herein.

In step 1006, a data protection response associated with the data is enacted in response to the received indication of the tampering. In an embodiment, contextual trigger monitor 110 further receives a tamper sensor contextual trigger 810 of security properties 122 associated with data 124. Tamper sensor contextual trigger 810 may be assigned to data 124 as described above (e.g., step 206 of FIG. 2). Tamper sensor contextual trigger 810 includes one or more contextual triggers related to sensors of computing device 102, such as one or more of the sensors described above and/or other types of sensors of device 102 that detect tampering. Contextual trigger monitor 110 operates over time to determine if any of the tamper sensor contextual trigger(s) have been detected by a tamper sensor of tamper sensors 804.

For example, tamper sensor contextual trigger 810 may indicate one or more tamper sensor contextual triggers such as screw tampering (as monitored in step 1102 of FIG. 11), housing separation (as monitored in step 1104 of FIG. 11), housing damage (as monitored in step 1106 of FIG. 11), interior light sensing (as monitored in step 1108 of FIG. 11), and/or other tamper sensor contextual triggers.

Contextual trigger monitor 110 is configured to compare the tamper indications received in tamper indicator 806 to the tamper sensor contextual triggers of tamper sensor contextual trigger 810. If contextual trigger monitor 110 determines that a tamper sensor contextual trigger has been detected, then contextual trigger monitor 110 notifies data protection enactor 112 by generating a tamper notification 808. Tamper notification 808 indicates that a data protection response should be enacted with respect to data 124.

Note that in an embodiment, contextual trigger monitor 110 may receive predetermined tamper indications in tamper indicator 806 that are not considered tampering, and are therefore filtered out by contextual trigger monitor 110 as not warranting data protection. For instance, tamper indicator 806 may indicate that screws of the computing device are being turned in a particular order (e.g., as detected by screw sensor 1208 of FIG. 12). However, tamper sensor contextual trigger 810 may indicate that a particular predetermined sequence of screw turnings is acceptable (e.g., a sequential order in which screws of the device may properly be removed), and not indicative of tampering. Such a predetermined sequence may be reserved for and known by persons authorized to open the computing device for maintenance, repair, upgrading, and/or other purposes. If contextual trigger monitor 110 detects receiving such a predetermined sequence in tamper indicator 806, and/or other sensor data that is not indicative of tampering, contextual trigger monitor 110 may not generate tamper notification 808.

As shown in FIG. 8, data protection enactor 112 receives tamper notification 808 and data protection response(s) 812. Based on tamper notification 808, data protection enactor 112 may enact the data protection response(s) 812 in security properties 122 associated with data 124. As described above, data protection enactor 112 is configured to enact the data protection response(s) 812 when tamper indicator 806 indicates tampering that matches a tamper sensor contextual trigger of tamper sensor contextual trigger 810.

Accordingly, in embodiments, data protections may be triggered for data based on context, such as device tampering. Examples of such data protections include soft deletes, hard deletes, alerts, etc. In the case of device tampering, a hard delete may be desirable to use as a data protection response. This is because it is very likely that an unauthorized person is attempting to extract a memory device from the computing device to access data stored thereon. The memory device will likely be lost to the owner of the computing device, and therefore sensitive data stored thereon may as well be permanently deleted before the unauthorized person has successfully extracted the memory device. It is noted that if the data is soft deleted, the data may be restored once it is determined that the threat of unauthorized data access has diminished or passed (e.g., step 602 of FIG. 6), such as in the case the unauthorized person is not successful at extracting the memory device and the computing device is recovered, etc.

As described above, security module 802 (FIG. 8) may be implemented in a computing device in various ways, such that security module 802 is able to protect sensitive data even when the computing device is turned off. For instance, FIGS. 13A-13D show various example implementations of security module 802 in a computing device, according to embodiments. FIGS. 13A-13D are described as follows.

FIG. 13A shows an example embodiment of security module 802, where security module 802 is implemented in a circuit 1302. In such an embodiment, security module 802 may be implemented in pure hardware (no firmware or software). The hardware may include one or more integrated circuit chips (e.g., ASICs (application specific integrated circuits)), FPGAs (field programmable gate arrays), resistors, capacitors, inductors, transistors, switches, and/or other hardware components configured to implement the functions of security module 802. In another embodiment, circuit 1302 may include firmware in addition to hardware to perform its functions. For instance, circuit 1302 may further include one or more processor circuits configured to execute the firmware to implement the functions of security module 802. Circuit 1302 is coupled to a battery of the computing device (e.g., a rechargeable battery) that provides power to allow circuit 1302 to operate even when the computing device is turned off.

Note that circuit 1302 may include its own battery (rechargeable or not rechargeable) to provide power to circuit 1302 to operate security module 802 even if the one or more batteries that provide power to the rest of the computing device are fully discharged and no longer able to provide power.

FIG. 13B shows an example embodiment of security module 802, where security module 802 is implemented in a system-on-chip (SOC) 1304. SOC 1304 is an example of circuit 1302, and includes an integrated circuit chip that implements the functions of security module 802. SOC 1304 may be entirely hardware, or may include firmware that executes in one or more processor circuits of SOC 1304. SOC 1304 is provided with power (e.g., from its own battery and/or other battery of the computing device) to execute even when the computing device is turned off.

FIG. 13C shows another example embodiment of security module 802, where security module 802 is implemented in a second operating system (OS) 1306. Second OS 1306 is a secondary OS for the computing device is capable of supporting the execution of security module 802. In such an embodiment, security module 802 may implemented in software that executes in one or more processor circuits 1314 of the computing device. Second OS 1306 does not include all of the functions of the main OS because fewer functions are needed to support security module 802, to consume less storage space, and to operate at lower power. Processor circuit 1314 is provided with power (e.g., from its own battery and/or other battery of the computing device) to execute even when the computing device is turned off Processor circuit 1314 may be included in hardware that is separate from the processor circuitry/hardware that executes the main OS of the computing device.

For instance, FIG. 13D shows an example implementation of security module 802 in second OS 1306, which is separate from main OS 814 of the computing device. As shown in FIG. 13D, main OS 814 operates in one or more processor circuits 1312, which are implemented in first integrated circuit(s) 1308. Second OS 1306 operates one or more processor circuits 1304, which are implemented in second integrated circuit(s) 1310. First and second integrated circuits(s) are separate from each other in the embodiment of FIG. 13D. In this manner, second integrated circuit(s) 1310 can receive power to operate in a power on mode even when first integrated circuit(s) 1308 do not receive power, or operate in a low power mode, when the computing device is turned off.

IV. Example Mobile and Stationary Device Embodiments

Computing device 102, server 104, user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, security module 802, main OS 814, circuit 1302, system-on-chip 1304, second OS 1306, integrated circuit(s) 1308, integrated circuit(s) 1310, processor circuit 1312, processor circuit 1314, flowchart 200, step 302, flowchart 400, flowchart 500, step 602, step 702, step 902, flowchart 1000, and flowchart 1100 may be implemented in hardware, or hardware combined with software and/or firmware. For example, user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, security module 802, main OS 814, second OS 1306, flowchart 200, step 302, flowchart 400, flowchart 500, step 602, step 702, step 902, flowchart 1000, and/or flowchart 1100 may be implemented as computer program code/instructions configured to be executed in one or more processors and stored in a computer readable storage medium. Alternatively, computing device 102, server 104, user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, security module 802, main OS 814, circuit 1302, system-on-chip 1304, second OS 1306, integrated circuit(s) 1308, integrated circuit(s) 1310, processor circuit 1312, processor circuit 1314, flowchart 200, step 302, flowchart 400, flowchart 500, step 602, step 702, step 902, flowchart 1000, and/or flowchart 1100 may be implemented as hardware logic/electrical circuitry.

For instance, in an embodiment, one or more, in any combination, of user interface module 108, contextual trigger monitor 110, data protection enactor 112, DS selector 116, DPR selector 118, CT selector 120, data protection system 136, system 800, security module 802, main OS 814, circuit 1302, system-on-chip 1304, second OS 1306, integrated circuit(s) 1308, integrated circuit(s) 1310, processor circuit 1312, processor circuit 1314, flowchart 200, step 302, flowchart 400, flowchart 500, step 602, step 702, step 902, flowchart 1000, and/or flowchart 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
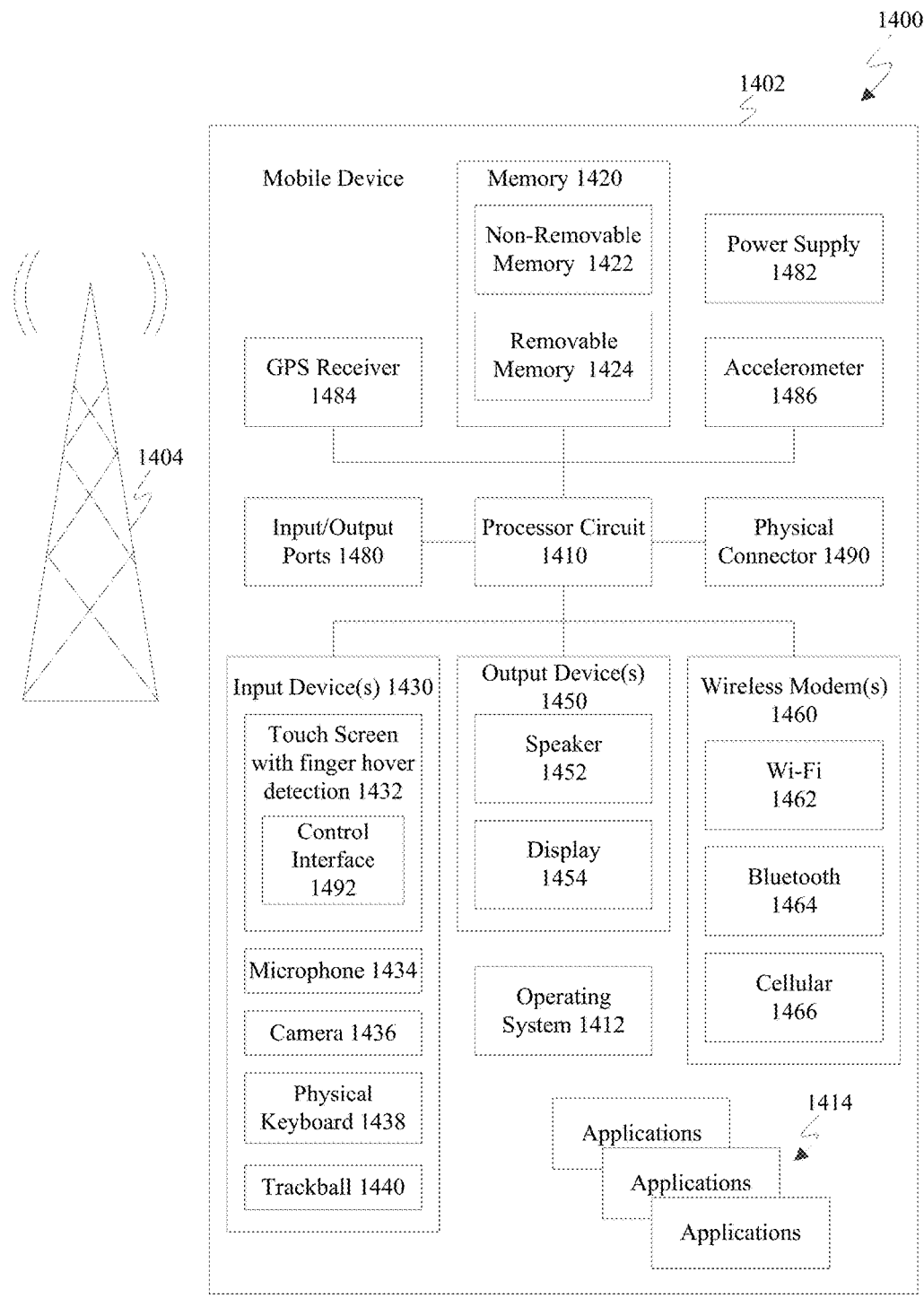
FIG. 14 shows a block diagram of an exemplary user device in which embodiments may be implemented.

FIG. 14 shows a block diagram of an exemplary mobile device 1400 including a variety of optional hardware and software components, shown generally as components 1402. For instance, components 1402 of mobile device 1400 are examples of components that may be included in computing device 102 (FIG. 1) in mobile device embodiments. Any number and combination of the features/elements of components 1402 may be included in a mobile device embodiment, as well as additional and/or alternative features/elements, as would be known to persons skilled in the relevant art(s). It is noted that any of components 1402 can communicate with any other of components 1402, although not all connections are shown, for ease of illustration. Mobile device 1400 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1404, such as a cellular or satellite network, or with a local area or wide area network.

The illustrated mobile device 1400 can include a controller or processor referred to as processor circuit 1410 for performing such tasks as signal coding, image processing, data processing, input/output processing, power control, and/or other functions. Processor circuit 1410 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1410 may execute program code stored in a computer readable medium, such as program code of one or more applications 1414, operating system 1412, any program code stored in memory 1420, etc. Operating system 1412 can control the allocation and usage of the components 1402 and support for one or more application programs 1414 (a.k.a. applications, "apps", etc.). Application programs 1414 can include common mobile computing applications (e.g., email applications, calendars, contact managers, web browsers, messaging applications) and any other computing applications (e.g., word processing applications, mapping applications, media player applications).

As illustrated, mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1420. These programs include operating system 1412, one or more application programs 1414, and other program modules and program data. Examples of such application programs or program modules may include, for example, computer program logic (e.g., computer program code or instructions) for implementing user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, security module 802, main OS 814, flowchart 200, step 302, flowchart 400, flowchart 500, step 602, step 702, step 902, flowchart 1000, and/or flowchart 1100 (including any suitable step of flowcharts 200, 400, 500, 1000, 1100), and/or further embodiments described herein.

Mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1432 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.25 inches and 0.05 inches, or between 0.5 inches and 0.75 inches or between 0.75 inches and 1 inch, or between 1 inch and 1.5 inches, etc.

The touch screen 1432 is shown to include a control interface 1492 for illustrative purposes. The control interface 1492 is configured to control content associated with a virtual element that is displayed on the touch screen 1432. In an example embodiment, the control interface 1492 is configured to control content that is provided by one or more of applications 1414. For instance, when a user of the mobile device 1400 utilizes an application, the control interface 1492 may be presented to the user on touch screen 1432 to enable the user to access controls that control such content. Presentation of the control interface 1492 may be based on (e.g., triggered by) detection of a motion within a designated distance from the touch screen 1432 or absence of such motion. Example embodiments for causing a control interface (e.g., control interface 1492) to be presented on a touch screen (e.g., touch screen 1432) based on a motion or absence thereof are described in greater detail below.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 can comprise speech-recognition software as part of a voice control interface that allows a user to operate the device 1400 via voice commands. Further, device 1400 can comprise input devices and software that allows for user interaction via a user's spatial gestures, such as detecting and interpreting gestures to provide input to a gaming application.

Wireless modem(s) 1460 can be coupled to antenna(s) (not shown) and can support two-way communications between processor circuit 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). Cellular modem 1466 may be configured to enable phone calls (and optionally transmit data) according to any suitable communication standard or technology, such as GSM, 3G, 4G, 5G, etc. At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be not present and other components can be additionally present as would be recognized by one skilled in the art.

Figure 15:
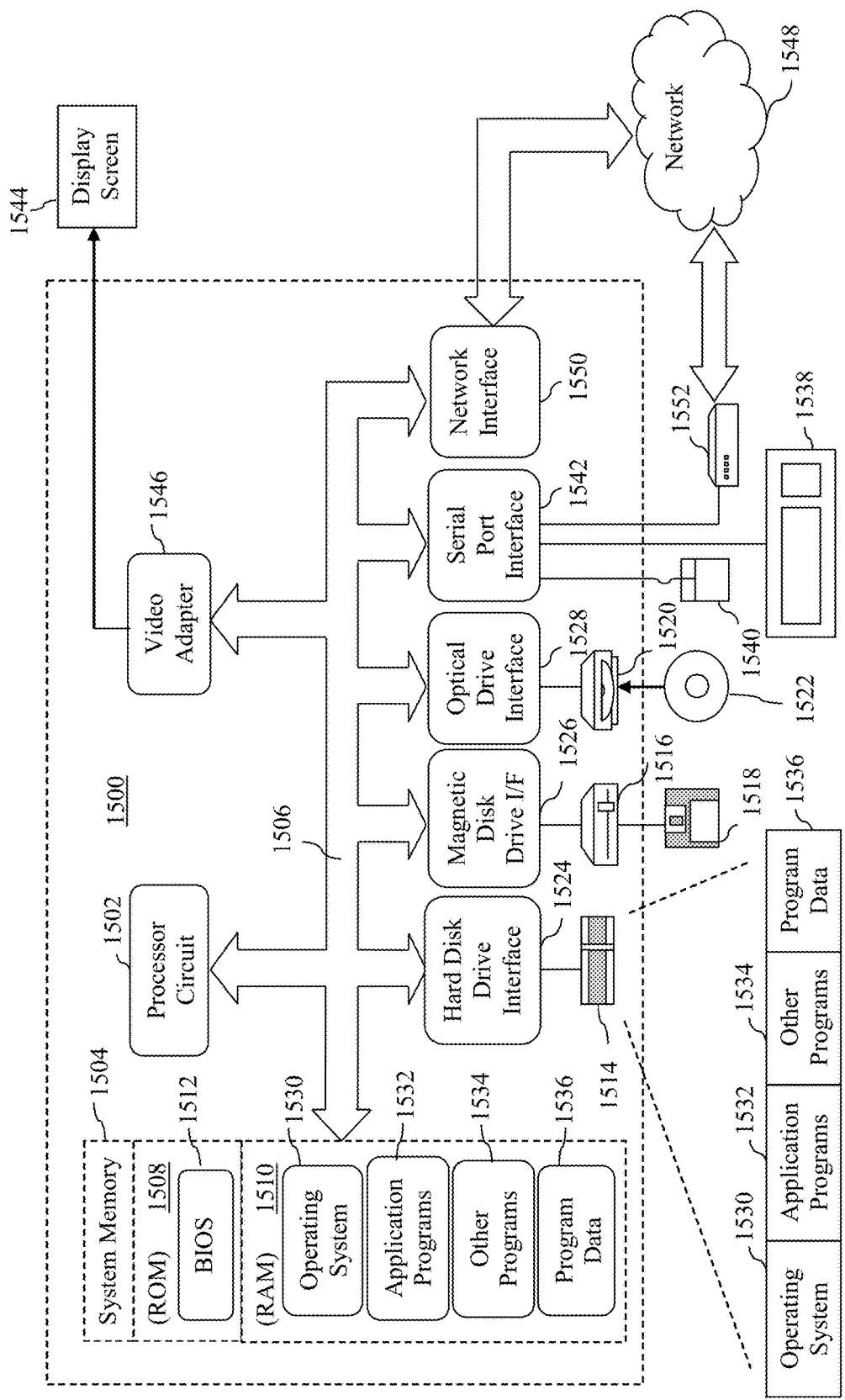
FIG. 15 shows a block diagram of an example computing device that may be used to implement embodiments.

Furthermore, FIG. 15 depicts an exemplary implementation of a computing device 1500 in which embodiments may be implemented. For example, computing device 102 and/or server 104 (FIG. 1) may be implemented in one or more computing devices similar to computing device 1500 in stationary computer embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, security module 802, main OS 814, flowchart 200, step 302, flowchart 400, flowchart 500, step 602, step 702, step 902, flowchart 1000, and/or flowchart 1100 (including any suitable step of flowcharts 200, 400, 500, 1000, 1100), and/or further embodiments described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including memory 1420 of FIG. 14). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Example Embodiments

In one embodiment, a system in a computing device protects data stored by the computing device. The computing device includes a main operating system that executes in processor hardware of the computing device. The system comprises at least one sensor configured to detect tampering with the computing device, and a security module separate from the operating system that is configured to execute continuously in the computing device, including being configured to execute when the computing device is turned off. The security module is communicatively coupled with the at least one sensor. The security module includes a contextual trigger monitor configured to receive an indication of the detected tampering with the computing device, and a data protection enactor configured to enact a data protection response associated with the data in response to the receiving of the detected tampering.

In an embodiment of the system, the data protection response is a hard delete of the data.

In an embodiment of the system, the security module is implemented as a circuit.

In an embodiment of the system, the security module is implemented in a system-on-chip (SOC) device.

In an embodiment of the system, the system may further comprise a second operating system in which the security module is included.

In an embodiment of the system, the system may further comprise a processor circuit that executes the second operating system and is separate from the processor hardware that executes the main operating system, the processor circuit configured to operate in a power-on mode when the computing device is turned off.

In an embodiment of the system, the at least one sensor is configured to at least one of: monitor one or more screws that fasten a housing of the computing device and/or fasten a storage frame, monitor for portions of the housing becoming separated from each other, monitor for damage to the housing, or monitor for light within an enclosure formed by the housing.

In an embodiment of the system, the system may further comprise a user interface module that enables a data sensitivity level, a data protection response, and a contextual trigger to be associated with the data stored by the computing device.

In one embodiment, a method in a computing device protects data stored by the computing device. The computing device includes a main operating system that executes in processor hardware of the computing device. The method comprises: executing a security module that is separate from the operating system in the computing device and is communicatively coupled with at least one sensor. The executing the security module includes executing the security module when the computing device is turned off, receiving an indication from at least one sensor of tampering with the computing device, and enacting a data protection response associated with the data in response to the received indication of the tampering.

In one embodiment of the method, the security module is implemented as a circuit, and the executing the security module comprises operating the circuit.

In one embodiment of the method, the security module is implemented in a system-on-chip (SOC) device, and the executing the security module comprises operating the SOC device.

In one embodiment of the method, the executing the security module comprises executing a second operating system in which the security module is included.

In one embodiment of the method, the executing the security module further comprises executing the second operating system with a processor circuit that is separate from the processor hardware that executes the main operating system, the processor circuit configured to operate in a power-on mode when the computing device is turned off.

In one embodiment of the method, the at least one sensor is configured to perform at least one of: monitoring one or more screws that fasten a housing of the computing device and/or fasten a storage frame, monitoring for portions of the housing becoming separated from each other, monitoring for damage to the housing, or monitoring for light within an enclosure formed by the housing.

In another embodiment, a method in a computing device protects data stored by the computing device. The computing device includes a main operating system that executes in processor hardware of the computing device. The method comprises providing a user interface that enables a data protection response to be assigned to the data, the assigned data protection response including a hard delete of the data, and executing a security module that is separate from the operating system in the computing device and is communicatively coupled with at least one sensor. The executing the security module includes executing the security module when the computing device is turned off, receiving an indication from at least one sensor of tampering with the computing device, and enacting the data protection response associated with the data in response to the received indication of the tampering.

In one embodiment of the method, the security module is implemented as a circuit, and the executing the security module comprises executing the circuit.

In one embodiment of the method, the security module is implemented in a system-on-chip (SOC) device, and the executing the security module comprises executing the SOC device.

In one embodiment of the method, the executing the security module comprises executing a second operating system in which the security module is included.

In one embodiment of the method, the executing the security module further comprises executing the second operating system with a processor circuit that is separate from the processor hardware that executes the main operating system, the processor circuit configured to operate in a power-on mode when the computing device is turned off.

In one embodiment of the method, the at least one sensor is configured to perform at least one of: monitoring one or more screws that fasten a housing of the computing device and/or fasten a storage frame, monitoring for portions of the housing becoming separated from each other, monitoring for damage to the housing, or monitoring for light within an enclosure formed by the housing.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system in a computing device to protect data stored by the computing device, the computing device including a main operating system that executes in first hardware processor of the computing device, the system comprising:
   at least one sensor configured to detect tampering with the computing device; and
   a security module executing continuously in a second operating system in second hardware processor of the computing device, second operating system separate from the main operating system, the second hardware processor, including the security module and the second operating system, being in the computing device and configured to receive power from a battery of the computing device to remain in a powered-on state when the computing device is turned off, the security module communicatively coupled with the at least one sensor, the security module including:
   a contextual trigger monitor configured to receive an indication of the detected tampering with the computing device, and
   a data protection enactor configured to enact a data protection response in response to the receiving of the detected tampering, the data protection enactor configurable by a user interface that enables the data protection response to be associated with the data, the user interface enabling the data protection response to be selected from a plurality of data protection responses that include a hard delete of the data and a soft delete of the data.

2. The system of claim 1, wherein the data protection response is a hard delete of the data.

3. The system of claim 1, wherein the security module is implemented as a circuit.

4. The system of claim 3, wherein the security module is implemented in a system-on-chip (SOC) device.

5. The system of claim 1, wherein the second hardware processor comprises:
a processor circuit that executes the second operating system and is separate from the first hardware processor, the processor circuit configured to operate in a power-on mode when the computing device is turned off.

6. The system of claim 1, wherein the at least one sensor is configured to at least one of:
monitor one or more screws that fasten a housing of the computing device and/or fasten a storage frame;
monitor for portions of the housing becoming separated from each other;
monitor for damage to the housing; or
monitor for light within an enclosure formed by the housing.

7. The system of claim 1, wherein the user interface further enables a data sensitivity level, a data protection response, and a contextual trigger to be associated with the data stored by the computing device.

8. A method in a computing device to protect data stored by the computing device, the computing device including a main operating system that executes in first hardware processor of the computing device, the method comprising:
executing a security module continuously in a second operating system in second hardware processor of the computing device, the second operating system separate from the main operating system in the computing device and is communicatively coupled with at least one sensor, said executing the security module including:
receiving power in the second hardware processor that includes the security module and the second operating system, the second hardware processor being in the computing device and receiving power from a battery of the computing device to remain in a powered-on state when the computing device is turned off,
receiving an indication from at least one sensor of tampering with the computing device, and
enacting a data protection response in response to the received indication of the tampering, the enacting the data protection response being configurable by a user interface that enables the data protection response to be associated with the data, the user interface enabling the data protection response to be selected from a plurality of data protection responses that include a hard delete of the data and a soft delete of the data.

9. The method of claim 8, wherein the security module is implemented as a circuit, and said executing the security module comprises:
operating the circuit.

10. The method of claim 9, wherein the security module is implemented in a system-on-chip (SOC) device, and said executing the security module comprises:
operating the SOC device.

11. The method of claim 8, wherein said executing the security module further comprises:
executing the second operating system with a processor circuit that is separate from the first hardware processor, the processor circuit configured to operate in a power-on mode when the computing device is turned off.

12. The method of claim 8, wherein the at least one sensor is configured to perform at least one of:
monitoring one or more screws that fasten a housing of the computing device and/or fasten a storage frame;
monitoring for portions of the housing becoming separated from each other;
monitoring for damage to the housing; or
monitoring for light within an enclosure formed by the housing.

13. The method of claim 8, wherein the data protection response includes a soft delete of the data.

14. The system of claim 1, wherein the data protection response includes a soft delete of the data.

15. A method in a computing device to protect data stored by the computing device, the computing device including a main operating system that executes in first hardware processor of the computing device, the method comprising:
providing a user interface that enables a selection of a data protection response to be associated with the data from a plurality of data protection responses, the plurality of data protection responses including a hard delete of the data and a soft delete of the data;
executing a security module continuously in a second operating system in second hardware processor of the computing device, the second operating system separate from the main operating system in the computing device and is communicatively coupled with at least one sensor, said executing the security module including:
receiving power in the security module and the second operating system to remain in a powered-on state when the computing device is turned off,
receiving an indication from at least one sensor of tampering with the computing device, and
enacting the data protection response associated with the data in response to the received indication of the tampering, at least one of the receiving an indication or the enacting the data protection response being configurable by the user interface.

16. The method of claim 15, wherein the security module is implemented as a circuit, and said executing the security module comprises:
executing the circuit.

17. The method of claim 16, wherein the security module is implemented in a system-on-chip (SOC) device, and said executing the security module comprises:
executing the SOC device.

18. The method of claim 15, wherein said executing the security module further comprises:
executing the second operating system with a processor circuit that is separate from the first hardware processor, the processor circuit configured to operate in a power-on mode when the computing device is turned off.

19. The method of claim 18, wherein the at least one sensor is configured to perform at least one of:
monitoring one or more screws that fasten a housing of the computing device and/or fasten a storage frame;
monitoring for portions of the housing becoming separated from each other;
monitoring for damage to the housing; or
monitoring for light within an enclosure formed by the housing.

20. The method of claim 15, wherein the selected data protection response includes the soft delete of the data.

* * * * *